(12) United States Patent
Kimura et al.

(10) Patent No.: US 7,923,078 B2
(45) Date of Patent: Apr. 12, 2011

(54) LIGHT-MODULATING LIQUID-CRYSTAL ELEMENT

(75) Inventors: Masaki Kimura, Saitama (JP); Masaharu Arai, Saitama (JP); Masaharu Gotoh, Saitama (JP)

(73) Assignee: Adeka Corporation, Tokyo (JP)

( * ) Notice: Subject to any disclaimer, the term of this patent is extended or adjusted under 35 U.S.C. 154(b) by 190 days.

(21) Appl. No.: 12/088,445

(22) PCT Filed: Aug. 8, 2006

(86) PCT No.: PCT/JP2006/315663
§ 371 (c)(1), (2), (4) Date: Mar. 28, 2008

(87) PCT Pub. No.: WO2007/037071
PCT Pub. Date: Apr. 5, 2007

(65) Prior Publication Data
US 2009/0279043 A1    Nov. 12, 2009

(30) Foreign Application Priority Data

Sep. 28, 2005 (JP) .................. 2005-281948

(51) Int. Cl.
C09K 19/30 (2006.01)
C09K 19/20 (2006.01)
C09K 19/12 (2006.01)
G02F 1/133 (2006.01)

(52) U.S. Cl. ............... 428/1.1; 252/299.63; 252/299.65; 252/299.66

(58) Field of Classification Search .................... 428/1.1; 252/299.01, 299.63, 299.66, 299.67, 299.65
See application file for complete search history.

(56) References Cited

U.S. PATENT DOCUMENTS

| | | | |
|---|---|---|---|
| 4,671,618 A | 6/1987 | Wu et al. | |
| 4,673,255 A | 6/1987 | West et al. | |
| 4,685,771 A | 8/1987 | West et al. | |
| 4,688,900 A | 8/1987 | Doane et al. | |
| 5,344,587 A | 9/1994 | Coates et al. | |
| 5,374,371 A | 12/1994 | Takeuchi et al. | |
| 5,384,067 A | 1/1995 | Doane et al. | |
| 5,437,811 A | 8/1995 | Doane et al. | |
| 5,691,795 A * | 11/1997 | Doane et al. | 349/169 |
| 5,695,682 A | 12/1997 | Doane et al. | |
| 5,932,137 A | 8/1999 | Baba et al. | |
| 5,958,290 A | 9/1999 | Coates et al. | |
| 6,015,507 A | 1/2000 | Kobayashi et al. | |
| 6,049,366 A * | 4/2000 | Hakemi et al. | 349/86 |
| 6,331,881 B1 * | 12/2001 | Hatano et al. | 349/86 |
| 2001/0046009 A1 * | 11/2001 | Hatano et al. | 349/86 |

FOREIGN PATENT DOCUMENTS

| | | |
|---|---|---|
| CA | 1268032 | 4/1990 |
| EP | 0 743 350 | 11/1996 |
| JP | 61-502128 | 9/1986 |
| JP | 63-501512 | 6/1988 |
| JP | 2-86693 | 3/1990 |
| JP | 2-278230 | 11/1990 |
| JP | 3-52843 | 8/1991 |
| JP | 4-502781 | 5/1992 |
| JP | 5-249446 | 9/1993 |
| JP | 6-507505 | 8/1994 |
| JP | 7-507083 | 8/1995 |
| JP | 07-234394 | 9/1995 |
| JP | 2614854 | 2/1997 |
| JP | 2721497 | 11/1997 |
| WO | 83/01016 | 3/1983 |
| WO | 85/04262 | 9/1985 |

OTHER PUBLICATIONS

European Patent Office issued an European Search Report dated Feb. 12, 2010, Application No. 06 78 2489.

* cited by examiner

*Primary Examiner* — Shean C Wu
(74) *Attorney, Agent, or Firm* — Young & Thompson

(57) ABSTRACT

A light-modulating liquid-crystal element comprising two substrates which each have an electrode layer and at least one of which is transparent, and a light-modulating layer supported between these substrates, wherein the light-modulating layer comprises a nematic liquid-crystal material and a transparent solid substance, and the nematic liquid-crystal material comprises a compound represented by the following general formula (I), and/or a compound represented by the following general formula (II), and a compound represented by the general formula (III), the nematic liquid-crystal material being dispersed as independent microdroplets in the transparent solid substance, the microdroplets having an average particle diameter of 0.1 to 50 μm.

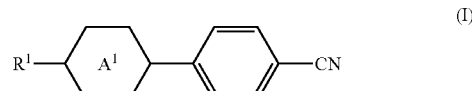

(I)

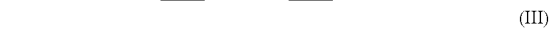

(III)

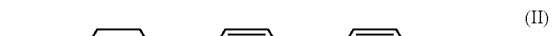

(II)

(In the formulae, $R^1$ to $R^3$ each independently is an alkyl group having 1 to 10 carbon atoms or the like;
$A^1$ and $A^2$ each independently is trans-1,4-cyclohexylene or 1,4-phenylene;
$X^1$ and $X^2$ each independently is a cyano group, an alkyl group having 1 to 10 carbon atoms, or the like.)

10 Claims, No Drawings

LIGHT-MODULATING LIQUID-CRYSTAL ELEMENT

TECHNICAL FIELD

The present invention relates to a liquid-crystal element with light-modulating properties.

BACKGROUND ART

A light-modulating liquid-crystal element comprising liquid crystals and a supporting transparent solid substance (e.g. a polymer) becomes cloudy (or white turbid) in the absence of an electric field, because incident light is scattered due to a difference in refractive indices between the transparent solid substance (e.g. a polymer) and liquid crystals, and other factors. On the other hand, when an electric field is applied, the liquid crystals align in the direction of the electric field and the refractive indices of the transparent solid substance (e.g. a polymer) and liquid crystals become similar, resulting in a transparent state. When the electric field is turned off, the element returns to the original cloudy state.

The characteristics required of a light-modulating liquid-crystal element are (1) that it shows sufficient contrast between the transparent state and the white turbid state, (2) that it can be driven at a low voltage, and (3) that it can operate in a wide temperature range, and the like. Furthermore, because the light-modulating liquid-crystal element is often used as a construction material and the like, there is a problem of yellowing by sunlight, room-light, and the like. Therefore, it is also an important requirement (4) that the light-modulating element has superior light resistance (or weather resistance).

To date, many kinds of light-modulating liquid-crystal elements have been proposed in order to satisfy these requirements.

For example, Patent Document 1 discloses a light-modulating liquid-crystal element wherein capsules filled with a nematic liquid-crystal material are dispersed in a resin. However, the process for manufacturing this light-modulating liquid-crystal element is complicated because of the presence of a microencapsulation step. Moreover, because water soluble polymers or aqueous polymer emulsions are used to prepare the element, its water resistance is inferior and, as a result, shows defects such as white turbidity, swelling, and deterioration of physical properties.

Further, Patent Documents 2 and 3 disclose light-modulating elements, wherein the liquid crystals that are initially dissolved in a resin are dispersed as microdroplets in the resin matrix as a result of phase separation of the liquid crystals during solidification of the resin. However, the ranges of applicable temperature of these light-modulating elements were narrow and their light resistance (or weather resistance) was unsatisfactory.

Further, Patent Document 4 discloses a light-modulating element wherein a nematic liquid-crystal material forms a continuous layer, in which is dispersed a transparent solid substance as a three-dimensional network. However, this light-modulating element was insufficient in the contrast between the transparent state and cloudy (or white turbid) state, and further was unsatisfactory with respect to the light resistance (or weather resistance).

Further, Patent Document 5 discloses a light-modulating element which comprises liquid crystals of a specific structure (i.e. tolans). However, this light-modulating element was inferior in light resistance (or weather resistance) and had a problem of yellowing.

As described above, the light-modulating elements that have been proposed to date did not fully satisfy the aforementioned requirements and the prevention of yellowing was insufficient in particular. Thus, there was a significant problem with the light resistance (or weather resistance).

Patent Document 1: Japanese Patent Laid-Open Publication No. H3-52843
Patent Document 2: Japanese Patent No. 2721497
Patent Document 3: Japanese Patent No. 2614854
Patent Document 4: U.S. Pat. No. 5,374,371
Patent Document 5: Japanese Patent No. 3427905

DISCLOSURE OF THE INVENTION

Problems to be Solved by the Invention

An object of the present invention is to provide a light-modulating crystal liquid element with a sufficient contrast which can be driven in a wide temperature range and has superior light resistance (or weather resistance) in particular.

Means for Solving the Problems

The present inventors have conducted intensive studies and found that a specific liquid-crystal material and its morphology can fulfill the above object.

The present invention has been made based on the above findings and provides a light-modulating liquid-crystal element, comprising two substrates which each have an electrode layer and at least one of which is transparent, and a light-modulating layer supported between these substrates, wherein the light-modulating layer comprises a nematic liquid-crystal material and a transparent solid substance, and the nematic liquid-crystal material comprises, as component (a), one or more compounds selected from a group represented by the following general formula (I) and/or, as component (b), one or more compounds selected from a group represented by the following general formula (II), and, as component (c), one or more compounds selected from a group represented by the general formula (III), the nematic liquid-crystal material being dispersed as independent microdroplets in the transparent solid substance, the microdroplets having an average particle diameter of 0.1 to 50 μm.

[Formula 1]

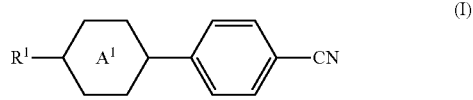

(I)

wherein $R^1$ is an alkyl group having 1 to 10 carbon atoms and optionally an ether bond or an alkoxy group having 1 to 10 carbon atoms,
$A^1$ is trans-1,4-cyclohexylene or 1,4-phenylene;

[Formula 2]

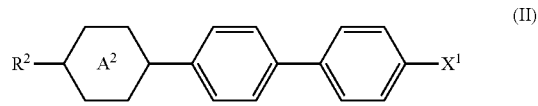

(II)

wherein $R^2$ is an alkyl group having 1 to 10 carbon atoms and optionally an ether bond or an alkoxy group having 1 to 10 carbon atoms, $A^2$ is trans-1,4-cyclohexylene or 1,4-phenylene, $X^1$ is a cyano group, an alkyl group having 1 to 10 carbon atoms and optionally an ether bond, or an alkoxy group having 1 to 10 carbon atoms;

[Formula 3]

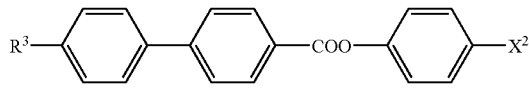

(III)

wherein $R^3$ is an alkyl group having 1 to 10 carbon atoms and optionally an ether bond or an alkoxy group having 1 to 10 carbon atoms, and $X^2$ is a cyano group, an alkyl group having 1 to 10 carbon atoms and optionally an ether bond, or an alkoxy group having 1 to 10 carbon atoms.

Further, the present invention provides the abovementioned light-modulating liquid-crystal element, wherein the nematic liquid-crystal material contains no compound with a partial structure represented by the following general formula (IV).

[Formula 4]

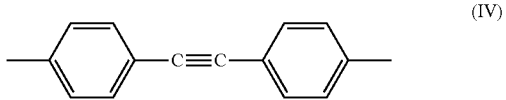

(IV)

wherein the benzene ring optionally has a plurality of substituents.

Further, the present invention provides the abovementioned light-modulating liquid-crystal element wherein the change in the yellowness index (Δb* in the L*, a*, b* color specification system) is 1.5 or less, when compared before and after the element is irradiated with ultraviolet light (wavelength, 300 to 400 mm) with intensity of 0.8 mW/cm² for 350 hours in an accelerated weathering tester.

PREFERRED EMBODIMENT OF THE INVENTION

The present invention provides a light-modulating liquid-crystal element comprising two substrates which each have an electrode layer and at least one of which is transparent, and a light-modulating layer supported between these substrates, wherein the light-modulating layer comprises a nematic liquid-crystal material and a transparent solid substance, and the nematic liquid-crystal material comprises, as a component (a), one or more compounds selected from a group represented by the following general formula (I), and/or, as component (b), one or more compounds selected from a group represented by the following general formula (II), and, as component (c), one or more compounds selected from a group represented by the general formula (II), the nematic liquid-crystal material being dispersed as independent microdroplets in the transparent solid substance, the microdroplets having an average particle diameter of 0.1 to 50 μm.

[Formula 5]

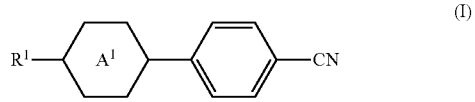

(I)

wherein $R^1$ is an alkyl group having 1 to 10 carbon atoms and optionally an ether bond or an alkoxy group having 1 to 10 carbon atoms, $A^1$ is trans-1,4-cyclohexylene or 1,4-phenylene;

[Formula 6]

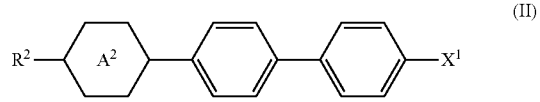

(II)

wherein $R^2$ is an alkyl group having 1 to 10 carbon atoms and optionally an ether bond or an alkoxy group having 1 to 10 carbon atoms, $A^2$ is trans-1,4-cyclohexylene or 1,4-phenylene, $X^1$ is a cyano group, an alkyl group having 1 to 10 carbon atoms and optionally an ether bond, or an alkoxy group having 1 to 10 carbon atoms;

[Formula 7]

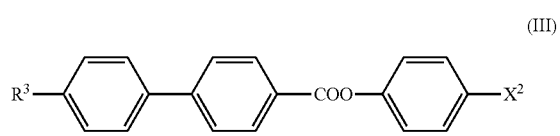

(III)

wherein $R^3$ is an alkyl group having 1 to 10 carbon atoms and optionally an ether bond or an alkoxy group having 1 to 10 carbon atoms, and $X^2$ is a cyano group, an alkyl group having 1 to 10 carbon atoms and optionally an ether bond, or an alkoxy group having 1 to 10 carbon atoms.

In the light-modulating liquid-crystal element of the present invention, the substrate may be either a solid material such as glass, metal, and the like, or a flexible material such as a plastic film. And two substrates may be made to face each other with an appropriate space between them and at least one of them is transparent so that the light-modulating layer supported between them may be visible from outside, though perfect transparency may not be essential. When the light-modulating liquid-crystal element of the present invention is used in order to respond to the light which passes through the element from one side to the other, both of the two substrates may be given appropriate transparency. Further, depending on the purpose, a transparent or opaque electrode as appropriate may be placed on the whole or a part of the surface of the substrates.

A nematic liquid-crystal material and a transparent solid substance are interposed between the two substrates. In addition, it is usually desirable to interpose a spacer for spacing between the two substrates according to the conventional art, as in the conventional liquid-crystal elements.

In the present invention, the nematic liquid-crystal material exists as independent microdroplets dispersed in the transparent solid substance, wherein the average particle diameter of the microdroplets is in the range of 0.1 to 50 μm, preferably 0.5 to 25 μm and more preferably 2 to 8 μm from the standpoint of making light scattering more efficient. Furthermore, from the standpoint of contrast, the proportion of microdroplets with a diameter of 10 μm or more is preferably 20% or less. In addition, from the standpoint of driving voltage and low-temperature driving, the proportion of microdroplets with a diameter of 1 μm or less is preferably 20% or less.

From the standpoint of contrast (i.e. an optical characteristic as a device), the proportion of the nematic liquid-crystal material in the light-modulating layer is preferably 30 to 70 wt % and more preferably 40 to 60 wt %. If the proportion exceeds 70 wt %, the diameter of the microdroplets becomes too large and microdroplets in a dispersed state become difficult to be realized, thus often causing problems with contrast or light scattering. If the proportion is less than 30 wt %, the contrast may become poor due to a decrease in the light-scattering components.

The nematic liquid-crystal material as the microdroplets form optical interfaces with the transparent solid substance, and in the absence of an electric field, the material scatters incident light resulting in a cloudy (or a white turbid) state, because of the difference in refractive indices between them. When an electric field is applied, the liquid crystals orient themselves in the direction of the electric field and the refractive index of the liquid crystals becomes similar to that of the transparent solid substance, resulting in a transparent state.

There is no restriction on the transparent solid substance, provided that it can contain the nematic liquid-crystal material dispersed as microdroplets. Its transparency may be determined appropriately depending on the purpose of usage of the element and, as regards its solidity, there may be selected not only a hard one but also a flexible, soft, or elastic one as long as the purposes are met.

Hereafter, the nematic liquid crystals used in the present invention will be described in more detail.

First, the compounds used as a component (a), which are represented by the following general formula (I), are described.

[Formula 8]

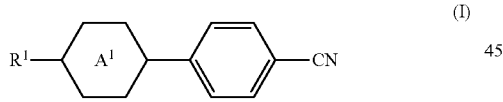

(I)

In the general formula (I), $R^1$ is an alkyl group having 1 to 10 carbon atoms and optionally an ether bond or an alkoxy group having 1 to 10 carbon atoms. As an alkyl group having 1 to 10 carbon atoms and optionally an ether bond, there may be mentioned, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, isononyl, decyl, methoxymethyl, methoxyethyl, and the like. And as an alkoxy group having 1 to 10 carbon atoms, there are mentioned, for example, methoxy, ethoxy, propoxy, butoxy, pentyloxy, heptyloxy, octyloxy, nonyloxy, decyloxy, and the like. Preferred as $R^1$ are, particularly from the standpoint of liquid-crystallinity (e.g. a wide range of nematic (Nem) phase, a narrow range of smectic (Sm) phase, low crystallinity, and low viscosity), linear alkyl groups having 2 to 7 carbon atoms, specifically ethyl, propyl, butyl, pentyl, and heptyl groups.

Further, $A^1$ represents trans-1,4-cyclohexylene or 1,4-phenylene.

As specific examples of compounds represented by the general formula (I), there are mentioned the following [Compound 1] to [Compound 36], but the general formula (I) is not limited to these compounds.

[Formula 9]

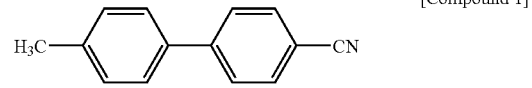
[Compound 1]

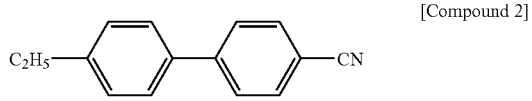
[Compound 2]

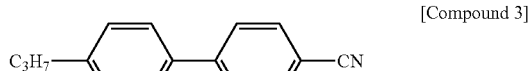
[Compound 3]

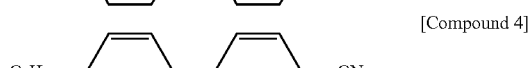
[Compound 4]

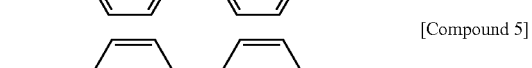
[Compound 5]

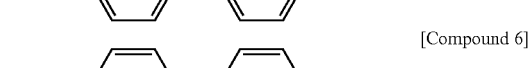
[Compound 6]

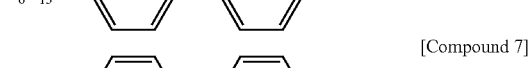
[Compound 7]

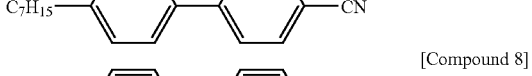
[Compound 8]

[Formula 10]

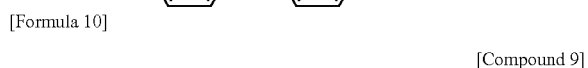
[Compound 9]

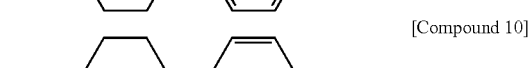
[Compound 10]

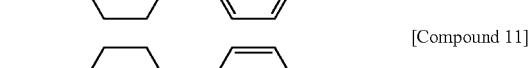
[Compound 11]

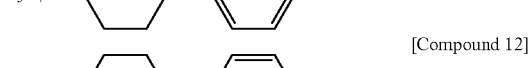
[Compound 12]

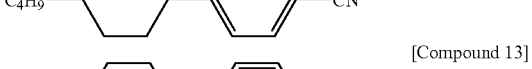
[Compound 13]

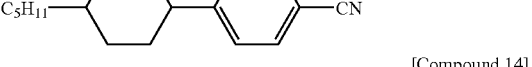
[Compound 14]

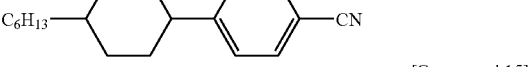
[Compound 15]

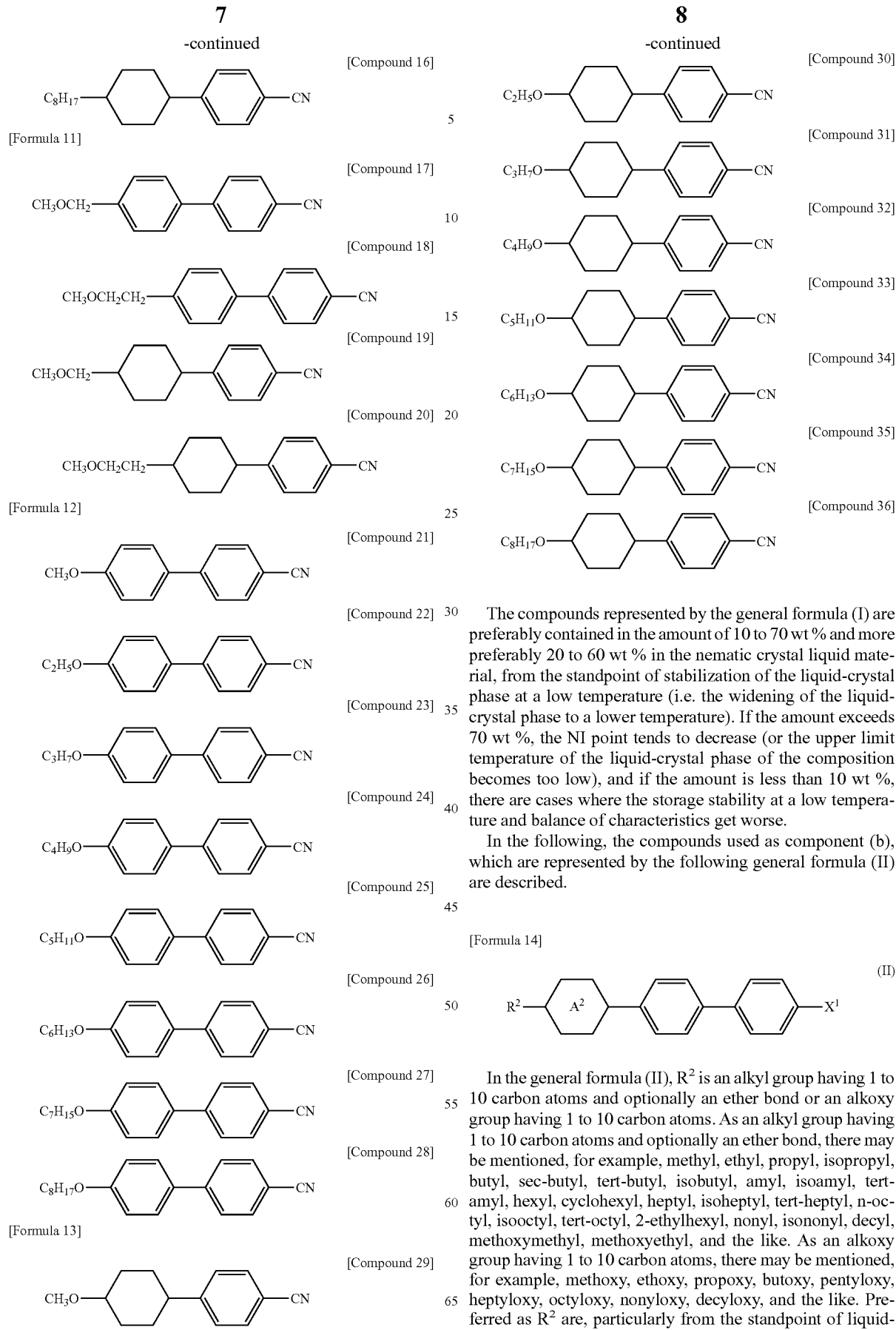

The compounds represented by the general formula (I) are preferably contained in the amount of 10 to 70 wt % and more preferably 20 to 60 wt % in the nematic crystal liquid material, from the standpoint of stabilization of the liquid-crystal phase at a low temperature (i.e. the widening of the liquid-crystal phase to a lower temperature). If the amount exceeds 70 wt %, the NI point tends to decrease (or the upper limit temperature of the liquid-crystal phase of the composition becomes too low), and if the amount is less than 10 wt %, there are cases where the storage stability at a low temperature and balance of characteristics get worse.

In the following, the compounds used as component (b), which are represented by the following general formula (II) are described.

[Formula 14]

$$R^2 - \boxed{A^2} - \boxed{\phantom{X}} - \boxed{\phantom{X}} - X^1 \quad (II)$$

In the general formula (II), $R^2$ is an alkyl group having 1 to 10 carbon atoms and optionally an ether bond or an alkoxy group having 1 to 10 carbon atoms. As an alkyl group having 1 to 10 carbon atoms and optionally an ether bond, there may be mentioned, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, isononyl, decyl, methoxymethyl, methoxyethyl, and the like. As an alkoxy group having 1 to 10 carbon atoms, there may be mentioned, for example, methoxy, ethoxy, propoxy, butoxy, pentyloxy, heptyloxy, octyloxy, nonyloxy, decyloxy, and the like. Preferred as $R^2$ are, particularly from the standpoint of liquid-crystallinity (e.g. a wide range of Nem phase, a narrow range of Sm phase, low crystallinity, and low viscosity), linear alkyl groups having 2 to 7 carbon atoms, specifically propyl and pentyl groups.

Further, $X^1$ is a cyano group, an alkyl group having 1 to 10 carbon atoms and optionally an ether bond, or an alkoxy group having 1 to 10 carbon atoms. As an alkyl group having 1 to 10 carbon atoms and optionally an ether bond, there may be mentioned, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, isononyl, decyl, methoxymethyl, methoxyethyl, and the like. As an alkoxy group having 1 to 10 carbon atoms, there may be mentioned, for example, methoxy, ethoxy, propoxy, butoxy, pentyloxy, heptyloxy, octyloxy, nonyloxy, decyloxy, and the like. $X^1$ is preferably a cyano group from the standpoint of a wide temperature range of the liquid-crystal state and large anisotropy of the refractive index, or an alkyl group with or without an ether group from the standpoint low viscosity.

Further, A is trans-1,4-cyclohexylene or 1,4-phenylene.

As specific examples of the compounds represented by the general formula (II), there may be mentioned the following [Compound 37] to [Compound 82], but the general formula (II) is not limited to these compounds.

[Formula 15]

[Compound 37]
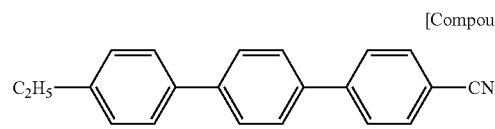

[Compound 38]
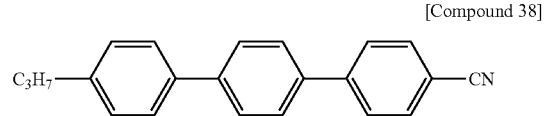

[Compound 39]
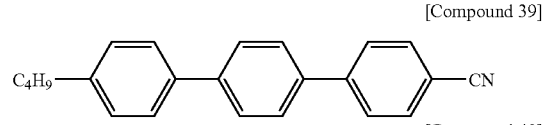

[Compound 40]
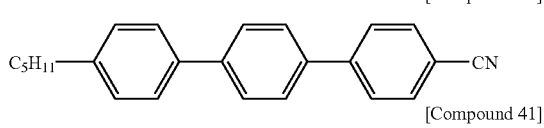

[Compound 41]
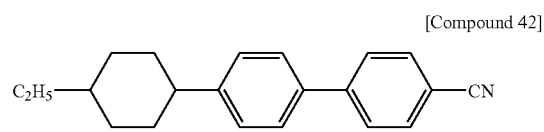

[Formula 16]

[Compound 42]
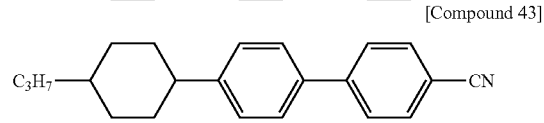

[Compound 43]
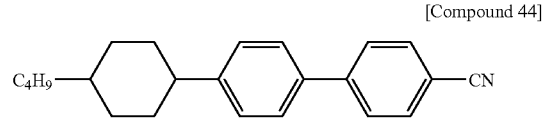

[Compound 44]
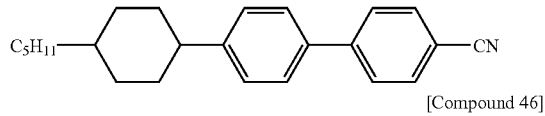

[Compound 45]
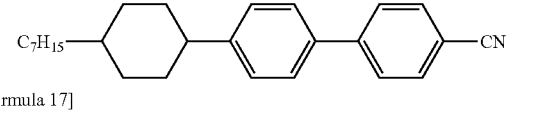

[Compound 46]
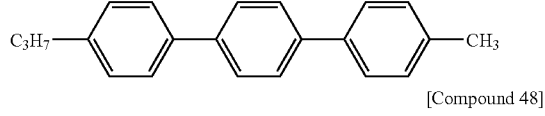

[Formula 17]

[Compound 47]
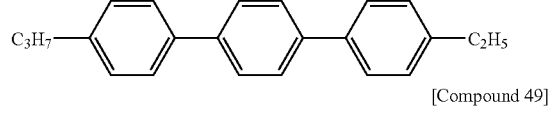

[Compound 48]
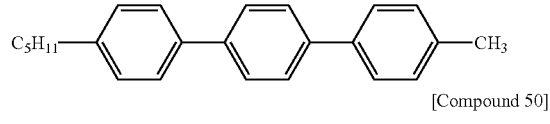

[Compound 49]
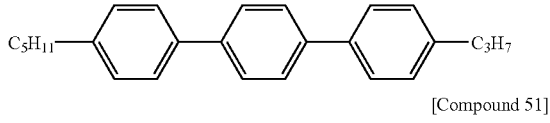

[Compound 50]
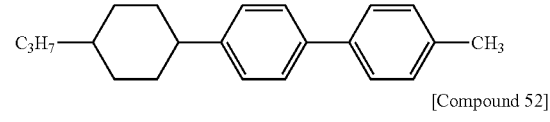

[Compound 51]
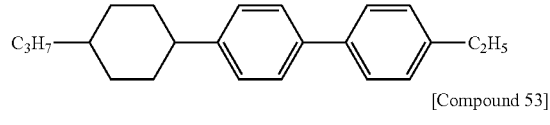

[Compound 52]
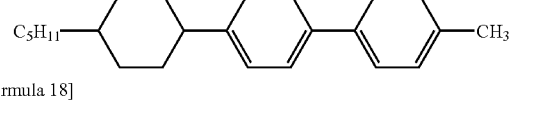

[Compound 53]
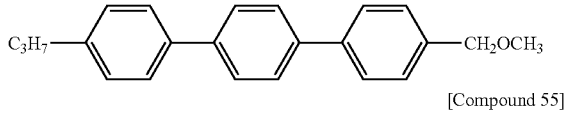

[Formula 18]

[Compound 54]
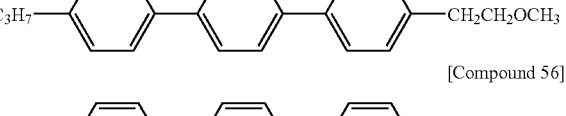

[Compound 55]
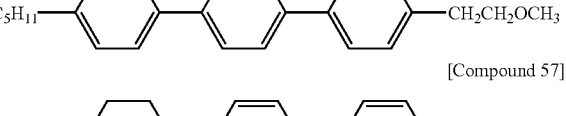

[Compound 56]
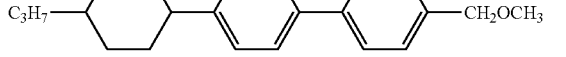

[Compound 57]

-continued

[Compound 58]
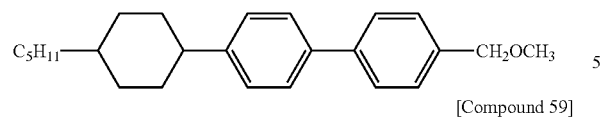

[Compound 59]
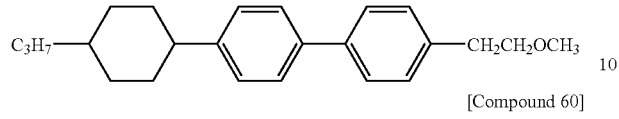

[Compound 60]
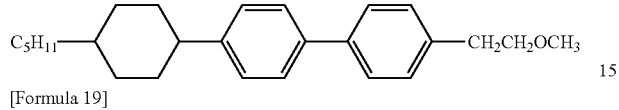

[Formula 19]

[Compound 61]
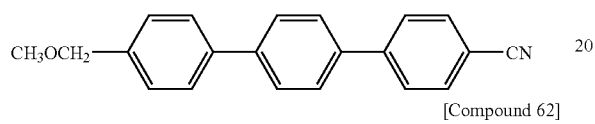

[Compound 62]
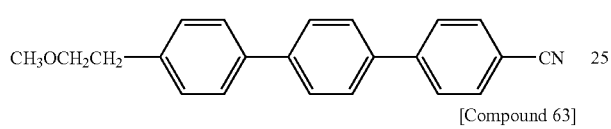

[Compound 63]
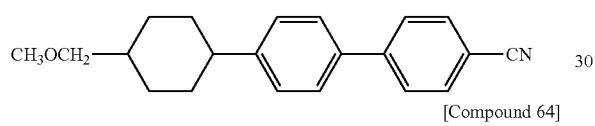

[Compound 64]
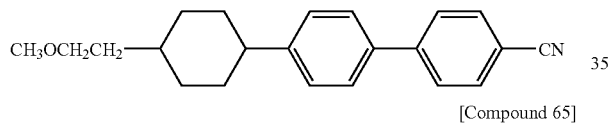

[Compound 65]
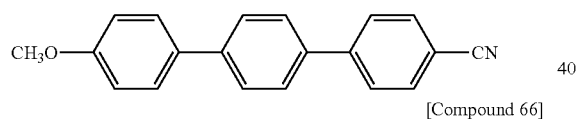

[Compound 66]
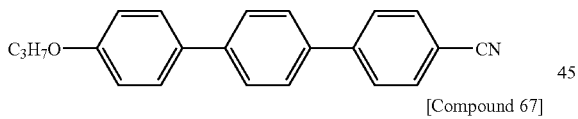

[Compound 67]
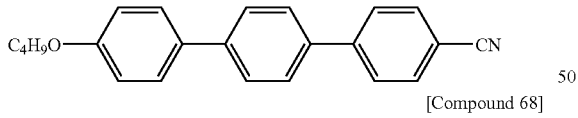

[Compound 68]
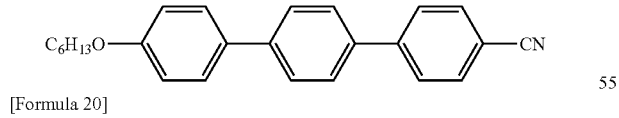

[Formula 20]

[Compound 69]
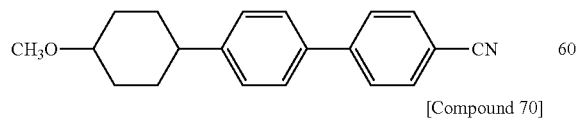

[Compound 70]
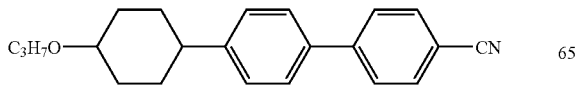

-continued

[Compound 71]
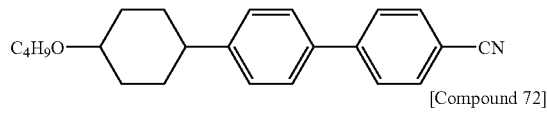

[Compound 72]
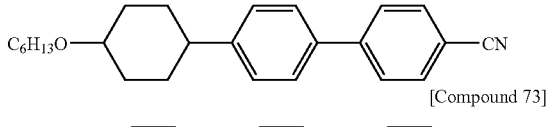

[Compound 73]
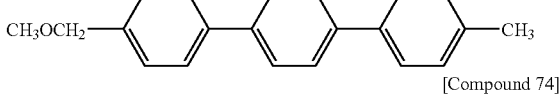

[Compound 74]
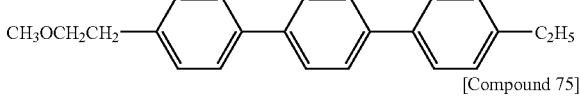

[Compound 75]
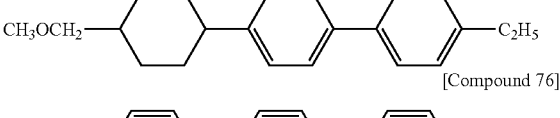

[Compound 76]
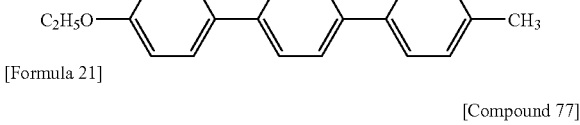

[Formula 21]

[Compound 77]
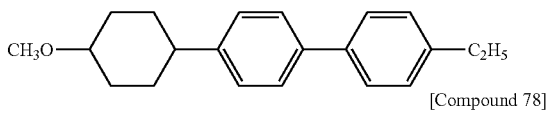

[Compound 78]
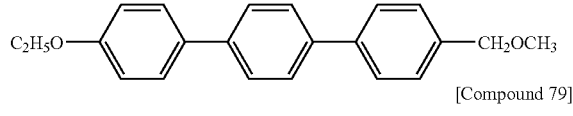

[Compound 79]
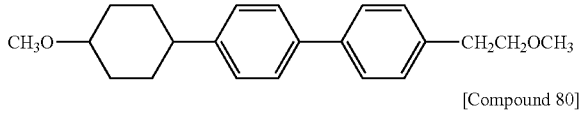

[Compound 80]
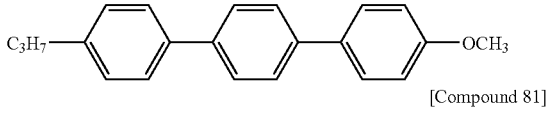

[Compound 81]
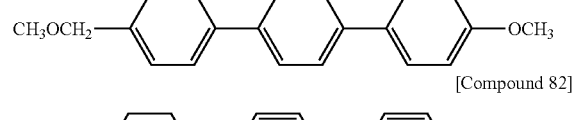

[Compound 82]
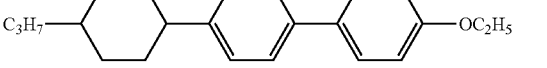

The compound represented by the general formula (II) is preferably contained in the nematic liquid-crystal material in the amount of 5 to 50 wt % and more preferably 10 to 30 wt %, from the standpoint of a transparency point and increase in Δn. The amount exceeding 50 wt % is not preferable because of increase in the smectic character. The amount less than wt % is not preferable because of occasional lowering of NI point and loss of balance of characteristic values such as Δn and the like.

The total amount of component (a), the compound represented by the general formula (I) and component (b), the compound represented by the general formula (II) is preferably 20 to 80 wt % and more preferably 30 to 70 wt % of the nematic liquid-crystal material, from the standpoint of liquid-crystallinity.

In the following, compounds used as a component (c), which are represented by the general formula (III) are described.

[Formula 22]

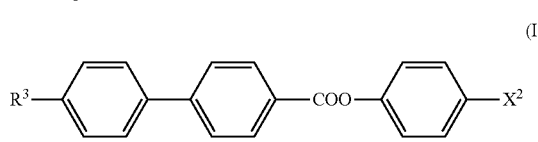

(III)

In the formula, $R^3$ is an alkyl group having 1 to 10 carbon atoms and optionally an ether bond or an alkoxy group having 1 to 10 carbon atoms. As an alkyl group having 1 to 10 carbon atoms and optionally an ether bond, there may be mentioned, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, isononyl, decyl, methoxymethyl, methoxyethyl, and the like. As an alkoxy group having 1 to 10 carbon atoms, there may be mentioned, for example, methoxy, ethoxy, propoxy, butoxy, pentyloxy, heptyloxy, octyloxy, nonyloxy, decyloxy, and the like. Preferred as $R^3$ are, particularly from the standpoint of liquid-crystallinity (e.g. a wide range of Nem phase, a narrow range of Sm phase, low crystallinity, and low viscosity), linear alkyl groups having 2 to 7 carbon atoms, specifically ethyl, propyl, pentyl, and heptyl groups.

Further, $X^2$ is a cyano group, an alkyl group having 1 to 10 carbon atoms and optionally an ether bond, or an alkoxy group having 1 to 10 carbon atoms. As an alkyl group having 1 to 10 carbon atoms and optionally an ether bond, there are mentioned, for example, methyl, ethyl, propyl, isopropyl, butyl, sec-butyl, tert-butyl, isobutyl, amyl, isoamyl, tert-amyl, hexyl, cyclohexyl, heptyl, isoheptyl, tert-heptyl, n-octyl, isooctyl, tert-octyl, 2-ethylhexyl, nonyl, isononyl, decyl, methoxymethyl, methoxyethyl, and the like. As an alkoxy group having 1 to 10 carbon atoms, there may be mentioned, for example, methoxy, ethoxy, propoxy, butoxy, pentyloxy, heptyloxy, octyloxy, nonyloxy, decyloxy, and the like. $X^2$ is preferably a cyano group from the standpoint of a wide temperature range of nematic phase, and an alkyl group with or without an ether group, particularly linear alkyl groups from the standpoint of low viscosity and storage stability at low temperature.

As specific examples of the general formula (III), the following [Compound 83] to [Compound 119] are mentioned, but the general formula (III) is not limited to these examples.

[Formula 23]

[Compound 83]

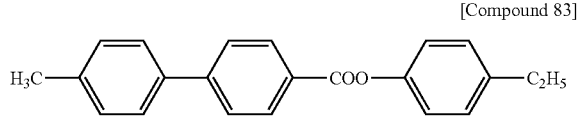

[Compound 84]

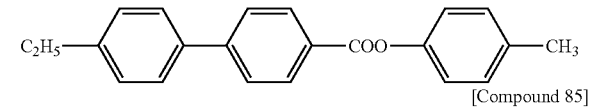

[Compound 85]

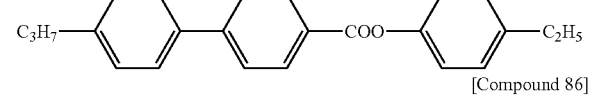

[Compound 86]

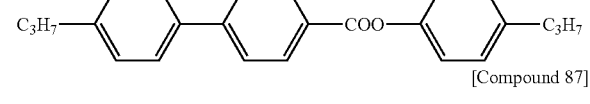

[Compound 87]

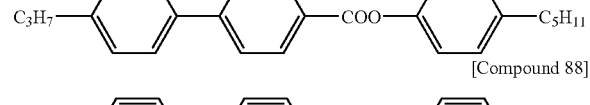

[Compound 88]

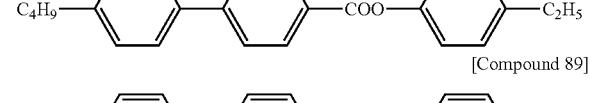

[Compound 89]

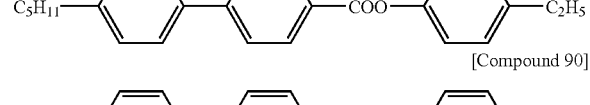

[Compound 90]

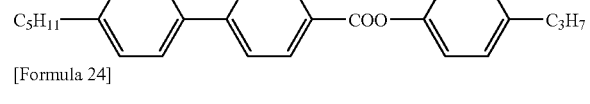

[Formula 24]

[Compound 91]

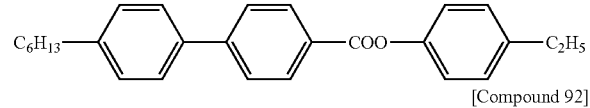

[Compound 92]

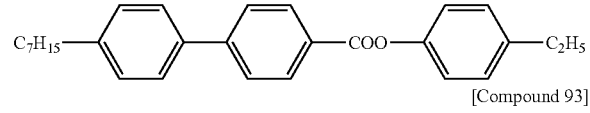

[Compound 93]

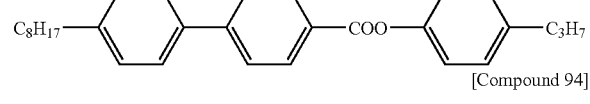

[Compound 94]

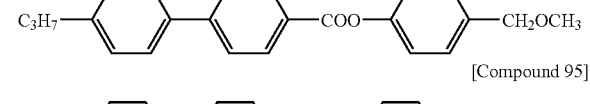

[Compound 95]

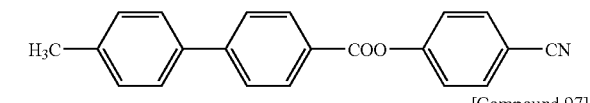

[Compound 96]

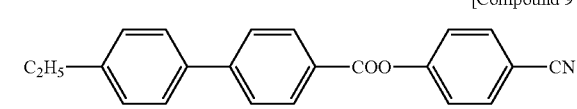

[Compound 97]

-continued

[Compound 98]
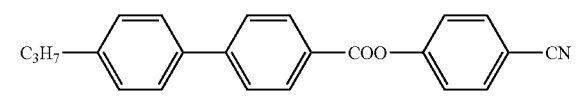

[Formula 25]

[Compound 99]
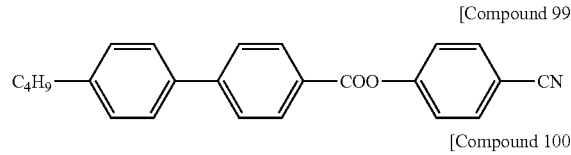

[Compound 100]
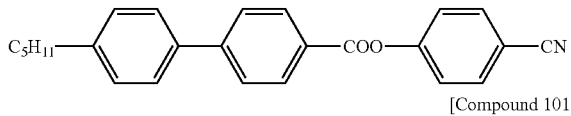

[Compound 101]
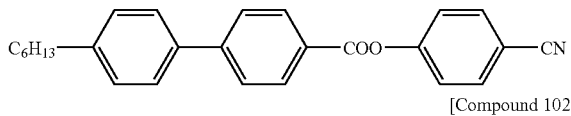

[Compound 102]
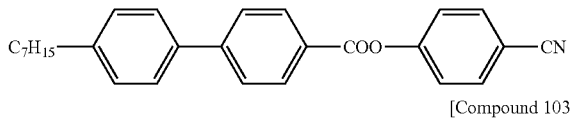

[Compound 103]
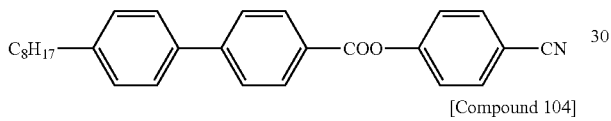

[Compound 104]
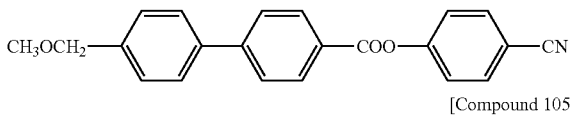

[Compound 105]
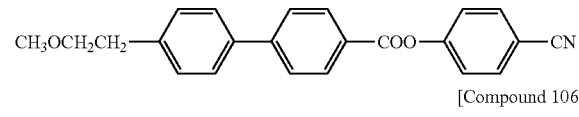

[Compound 106]
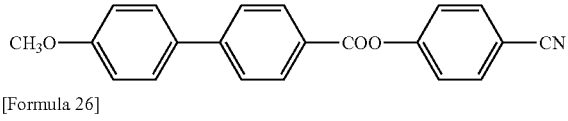

[Formula 26]

[Compound 107]
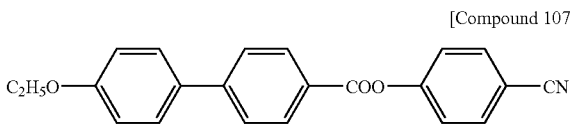

[Compound 108]
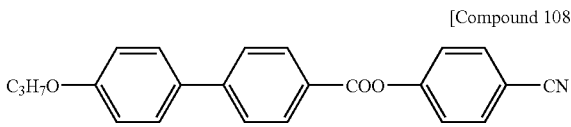

[Compound 109]
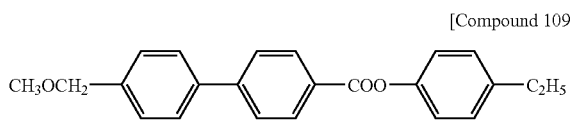

[Compound 110]
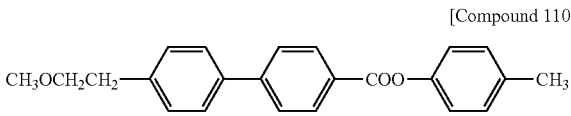

-continued

[Compound 111]
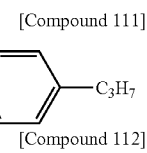

[Compound 112]
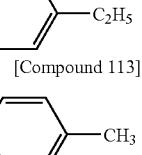

[Compound 113]
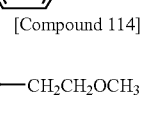

[Compound 114]
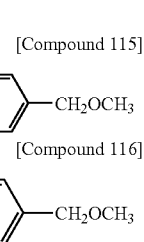

[Formula 27]

[Compound 115]
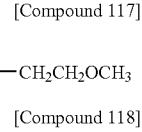

[Compound 116]
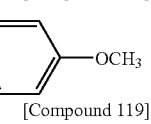

[Compound 117]
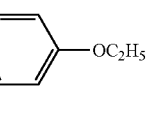

[Compound 118]
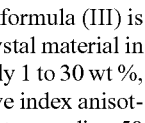

[Compound 119]
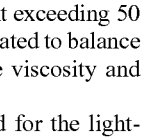

The compound represented by the general formula (III) is preferably contained in the nematic liquid-crystal material in the amount of 1 to 40 wt % and more preferably 1 to 30 wt %, from the standpoint of an increase in refractive index anisotropy and increase in the NI point. The amount exceeding 50 wt % is not preferable because of problems related to balance of characteristics, such as an increase in the viscosity and crystallinity (or a Sm property).

In the nematic liquid-crystal material used for the light-modulating liquid-crystal element of the present invention, the component (a), compounds represented by the general formula (I), is used singly or in a combination of two or more kinds, considering the balance of characteristics and the like of the nematic liquid-crystal material. The same is true with component (b), compounds represented by the general formula (II), and component (c), compounds represented by the general formula (III).

Further, the nematic liquid-crystal material used for the light modulating liquid-crystal element of the present invention may contain, in addition to the components (a) to (c), other liquid-crystal compounds used in the conventional light-modulating liquid-crystal elements.

Further, the nematic liquid-crystal material used in the light-modulating liquid-crystal element of the present invention preferably may not contain the compounds with a partial structure (hereafter, also referred to as a tolan structure) represented by the general formula (IV). In the general formula (IV), the benzene rings may have substituents.

[Formula 28]

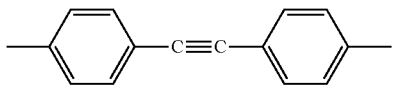
(IV)

The partial structure represented by the general formula (IV) is also called a tolan structure and a compound with this structure is called a tolan compound. As examples of the compounds with the partial structure represented by the general formula (IV), tolan liquid crystals and the like with a tolan structure in the molecule may be mentioned.

Compounds with the partial structure represented by the general formula (IV) (i.e. tolans) include, but not limited to, the following compounds represented by the general structure (V).

[Formula 29]

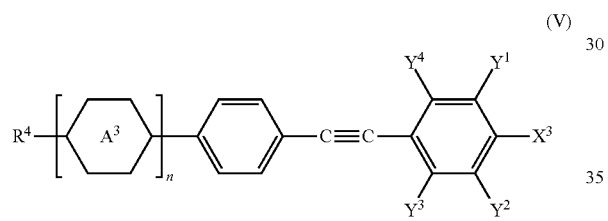
(V)

(In the formula, $R^4$ is an alkyl or alkenyl group having 1 to 10 carbon atoms and optionally an ether bond, or an alkoxy group having 1 to 10 carbon atoms; $A^3$ is trans-1,4-cyclohexylene or 1,4-phenylene; $X^3$ is a cyano group, a fluorine atom, an alkoxy group having 1 to 10 carbon atoms, an allyl group, or an alkyl group having 1 to 10 carbon atoms and optionally an ether bond; $Y^1$, $Y^2$, $Y^3$, and $Y^4$ are each independently a hydrogen atom or a fluorine atom; n is 0, 1, or 2.)

Specific examples of the compounds with partial structure represented by the general formula (IV) (i.e. tolans) include, but not limited to, the following [Compound 120] to [Compound 143].

[Formula 30]

[Compound 120]

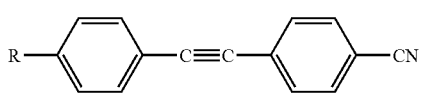

(In the formula, R represents an alkyl group.)

[Compound 121]

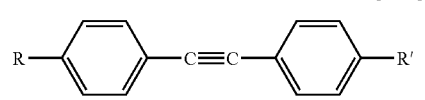

(In the formula, R and R' each independently represents an alkyl group.)

-continued

[Compound 122]

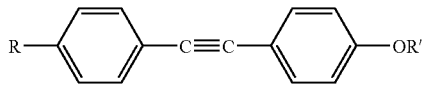

(In the formula, R and R' each independently represents an alkyl group.)

[Compound 123]

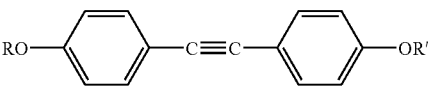

(In the formula, R and R' each independently represents an alkyl group.)

[Compound 124]

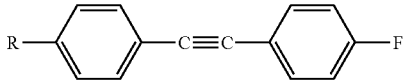

(In the formula, R represents an alkyl group.)

[Compound 125]

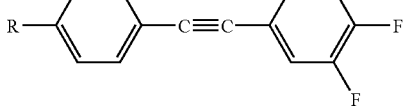

(In the formula, R represents an alkyl group.)

[Compound 126]

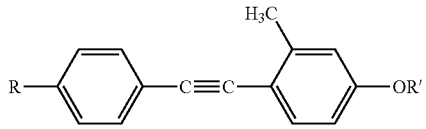

(In the formula, R and R' each independently represents an alkyl group.)

[Formula 31]

[Compound 127]

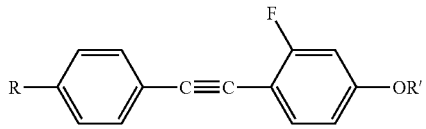

(In the formula, R and R' each independently represents an alkyl group.)

[Compound 128]

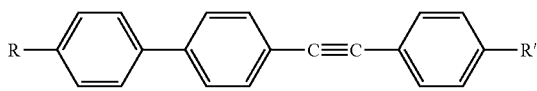

(In the formula, R and R' each independently represents an alkyl group.)

[Compound 129]

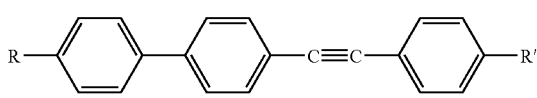

(In the formula, R and R' each independently represents an alkyl group.)

[Compound 130]

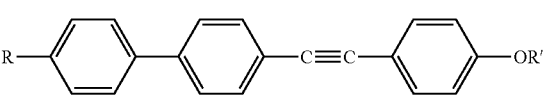

(In the formula, R and R' each independently represents an alkyl group.)

[Compound 131]

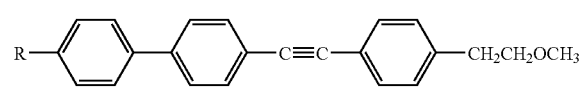

(In the formula, R represents an alkyl group.)

[Compound 132]

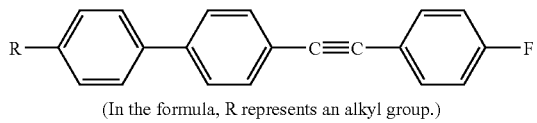

(In the formula, R represents an alkyl group.)

[Formula 32]

[Compound 133]

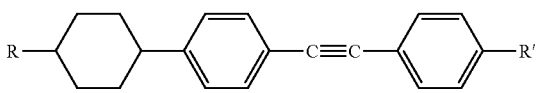

(In the formula, R and R' each independently represents an alkyl group.)

[Compound 134]

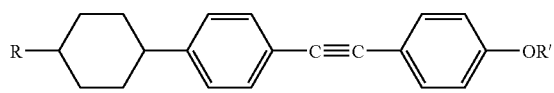

(In the formula, R and R' each independently represents an alkyl group.)

[Compound 135]

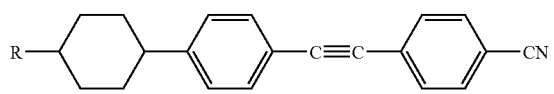

(In the formula, R represents an alkyl group.)

[Compound 136]

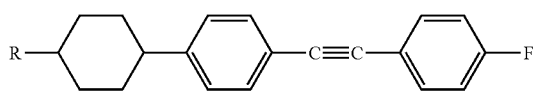

(In the formula, R represents an alkyl group.)

[Compound 137]

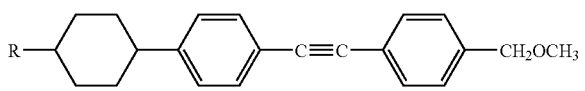

(In the formula, R represents an alkyl group.)

[Compound 138]

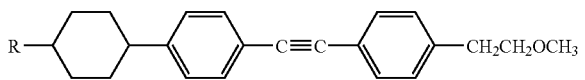

(In the formula, R represents an alkyl group.)

[Compound 139]

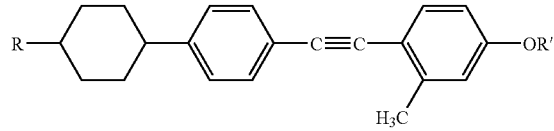

(In the formula, R and R' each independently represents an alkyl group.)

[Formula 33]

[Compound 140]

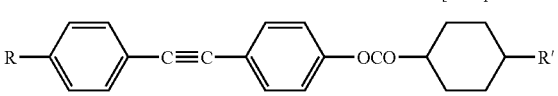

(In the formula, R and R' each independently represents an alkyl group.)

[Compound 141]

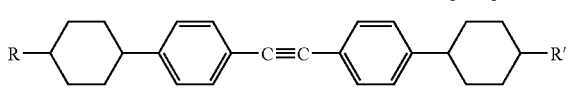

(In the formula, R and R' each independently represents an alkyl group.)

[Compound 142]

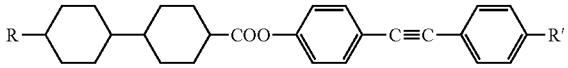

(In the formula, R and R' each independently represents an alkyl group.)

[Compound 143]

R—⬡—⬡—⬡—C≡C—⬡—R'

(In the formula, R and R' each independently represents an alkyl group.)

The nematic liquid-crystal material used for the light-modulating liquid-crystal element of the present invention will be described in further detail.

The transition temperature from isotropic to nematic phase (i.e. NI point) of the nematic liquid-crystal material of the present invention is preferably in the range of 60 to 120° C. and more preferably in the range of 80 to 100° C., from the standpoint of the temperature range for practical use of the optical elements.

Further, the nematic liquid-crystal material of the present invention has a superior storage stability and, for example, storage at −20° C. (and those with some excellent stability, storage at −20° C. even for 14 days or more) does not cause any crystallization, precipitation, turbidity, or the like.

Further, dielectric anisotropy (Δ∈) of the nematic liquid-crystal material of the present invention is preferably 5 or more from the standpoint of lowering the drive voltage of the element, but in order to suppress hysteresis of the element, it is preferably 20 or less. Considering these factors collectively, the dielectric anisotropy is preferably in the range of 5 to 25 and more preferably 10 to 20.

In the following, the transparent solid substance used for the light-modulating liquid-crystal element of the present invention will de described.

The amount of the transparent solid substance in the light-modulating layer is preferably 30 to 70 wt % and more preferably 40 to 60 wt %, from the standpoint of contrast (i.e. the optical characteristics as a device).

As the transparent solid substance of the present invention, glass, polymers, and the like may be mentioned, among which the polymers are particularly preferable. Polymers are obtained by polymerizing or curing one or two kinds or more of monomers or oligomers. The monomers or oligomers which constitute the polymers can be cured by heat or active energy rays (e.g. visible light, ultraviolet light, electron beam, and the like). They may also be cured preferably using a curing catalyst. Further, it is possible to polymerize (or cure) a polymerizable composition comprising one or more kinds of monomers or oligomers (e.g. a heat-curable or an active energy ray-curable composition). The polymerizable composition (e.g. a heat-curable composition or an active energy ray-curable composition) may contain, in addition to one or more kinds of monomers and oligomers, such components usually used for the conventional polymerizable (or curable) compositions such as a polymerization catalyst (or a polymerization initiator, a curing catalyst), a chain transfer agent, a photosensitizer, a cross-linking agent, a solvent (for example organic solvent, water, water-soluble solvent), a synthetic resin, and the like. The total amount of these components is preferably 10 wt % or less of the polymerizable composition.

The transparent solid substance of the present invention is preferably obtained by curing a monomer, an oligomer, or a polymerizable composition (or a curable composition) comprising a monomer and an oligomer by using active energy rays (e.g. visible light, ultraviolet light, electron beam, and the like).

The transparent solid substance of the present invention may have a laminated structure with similar or different materials and it may also be surface-treated and so on.

There is no particular restriction on the monomer which constitutes the polymer as the transparent solid substance. Examples include: styrene, chlorostyrene, α-methylstyrene, divinylbenzene; acrylates, methacrylates, or fumarates having substituents such as methyl, ethyl, propyl, butyl, amyl, 2-ethylhexyl, octyl, nonyl, dodecyl, hexadecyl, octadecyl, cyclohexyl, benzyl, methoxyethyl, butoxyethyl, phenoxyethyl, allyl, methallyl, glycidyl, 2-hydroxyethyl, 2-hydroxypropyl, 3-chloro-2-hydroxypropyl, dimethylaminoethyl, diethylaminoethyl, and the like; mono(meth)acrylates or poly(meth)acrylates of ethylene glycol, polyethylene glycol, propylene glycol, polypropylene glycol, 1,3-butylene glycol, tetramethylene glycol, hexamethylene glycol, neopentyl glycol, trimethylolpropane, glycerin, pentaerythritol, and the like; vinyl acetate, vinyl butyrate, or vinyl benzoate, acrylonitrile, cetyl vinyl ether, limonene, cyclohexene, diallyl phthalate, diallyl isophthalate, 2-, 3-, or 4-vinylpyridine, acrylic acid, methacrylic acid, acrylamide, methacrylamide, N-hydroxymethylacrylamide or N-hydroxyethylmethacrylamide and their alkyl ether derivatives; di(meth)acrylate of diol obtained by adding 2 mol or more of ethylene oxide or propylene oxide to 1 mol of neopentyl glycol; di- or tri-(meth)acrylate of triol obtained by adding 3 mol or more of ethylene oxide or propylene oxide to trimethylolpropane; di(meth)acrylate of diol obtained by adding 2 mol or more of ethylene oxide or propylene oxide to 1 mol of bisphenol A; a product of a reaction of 1 mol of 2-hydroxyethyl (meth)acrylate and 1 mol of phenyl isocyanate or n-butyl isocyanate; poly(meth)acrylate of dipentaerythritol, urethane (meth)acrylate; and the like. Further, a part or all of the hydrogen atoms of the above monomers may be substituted with fluorine atoms. Particularly preferable among the above monomers are trimethylolpropane triacrylate, tricyclodecanedimethylol diacrylate, polyethylene glycol diacrylate, polypropylene glycol diacrylate, hexane diol diacrylate, neopentyl glycol diacrylate, tris-(acryloxyethyl) isocyanurate, isomyristyl acrylate, hydroxypivalic acid neopentylglycol diacrylate (for example Kayarad:MANDA, produced by Nippon Kayaku Co., Ltd.), caprolactone-modified hydroxypivalic acid neopentyl glycol (for example, Kayarad: HX-220, HX-620, produced by Nippon Kayaku Co., Ltd.).

Further examples of the monomer include cationically polymerizable compounds such as epoxy compounds (aromatic, alicyclic, and aliphatic epoxy compounds), cyclic ethers, cyclic lactones, cyclic acetals, cyclic thioethers, spiroorthoesters, vinyl compounds, and the like.

As examples of the aromatic epoxy compounds are mentioned polyglycidyl ether of a polyol having at least one aromatic ring or its alkylene oxide adduct, for example, glycidyl ether of bisphenol A, bisphenol F, or alkylene oxide adducts of these compounds, and epoxy novolac resins, and the like.

As examples of the alicyclic epoxy compounds are mentioned polyglycidyl ether of polyol containing at least one alicyclic ring, or cyclohexene oxide or cyclopentene oxide unit-containing compounds obtained by epoxidation of cyclohexene or cyclopentene ring-containing compounds by an oxidizing agent. As specific examples are mentioned hydrogenated bisphenol A diglycidyl ether, 3,4-epoxycyclohexylmethyl-3,4-epoxycyclohexyl carboxylate, 3,4-epoxy-1-methylcyclohexyl-3,4-epoxy-1-methylcyclohexanecarboxylate, 6-methyl-3,4-epoxycyclohexylmethyl-6-methyl-3,4-epoxycyclohexanecarboxylate, 3,4-epoxy-3-methylcyclohexylmethyl-3,4-epoxy-3-methylcyclohexanecarboxylate, 3,4-epoxy-5-methylcyclohexylmethyl-3,4-epoxy-5-methylcyclohexanecarboxylate, 2-(3,4-epoxycyclohexyl-5,5-spiro-3,4-epoxy)cyclohexane-metadioxane, bis(3,4-epoxycyclohexylmethyl) adipate, vinylcyclohexene dioxide, 4-vinylepoxycyclohexene, bis(3,4-epoxy-6-methylcyclohexylmethyl) adipate, 3,4-epoxy-6-methylcyclohexyl carboxylate, methylenebis(3,4-epoxycyclohexane), dicyclopentadiene diepoxide, ethylene glycol di(3,4-epoxycyclohexylmethyl)ether, ethylene bis(3,4-epoxycyclohexanecarboxylate), dioctyl epoxyhexahydrophthalate, di-2-ethylhexyl epoxyhexahydrophthalate, and the like.

As examples of the aliphatic epoxy compounds are mentioned polyglycidyl ether of aliphatic polyol or its alkylene oxide adduct, polyglycidyl ester of aliphatic long-chain polybasic acid, homopolymer of glycidyl acrylate or glycidyl methacrylate, copolymers of glycidyl acrylate or methacrylate, and the like. Representative examples include glycidyl ether of polyols such as 1,4-butanediol diglycidyl ether, 1,6-hexanediol diglycidyl ether, glycerin triglycidyl ether, trimethylolpropane triglycidyl ether, sorbitol tetraglycidyl ether, dipentaerythritol hexaglycidyl ether, polyethylene glycol diglycidyl ether, polypropylene glycol diglycidyl ether; polyglycidyl ether of polyether polyol obtained by addition of one or two kinds or more of alkylene oxide to aliphatic polyols such as propylene glycol, glycerin, and the like; diglycidyl ester of aliphatic long-chain dibasic acid, and the like. The following compounds may further be mentioned: monoglycidyl ether of aliphatic higher alcohol, phenol, cresol, butylphenol, or monoglycidyl ether of polyether alcohol obtained by addition of alkylene oxide to these; glycidyl ester of higher fatty acid; epoxidized soybean oil, epoxidized octyl stearate, epoxidized butyl stearate, epoxidized linseed oil, epoxidized polybutadiene, and the like.

Further, as specific examples of cationically polymerizable compounds other than epoxy compounds are mentioned: oxetane compounds such as trimethylene oxide, 3,3-dimethyloxetane, 3,3-dichloromethyloxetane, and the like; trioxanes such as tetrahydrofuran, 2,3-dimethyltetrahydrofuran, and the like; cyclic ethers such as 1,3-dioxolane, 1,3,6-trioxacyclooctane, and the like; cyclic lactones such as β-propiolactone, ∈-caprolactone, and the like; thiiranes such as ethylene sulfide, 3,3-dimethylthietane, and the like; thietanes such as 1,3-propyne sulfide, 3,3-dimethylthietane, and the like; cyclic thioethers such as tetrahydrothiophene derivatives and the like; spiroorthoesters obtained by reacting epoxy compounds with lactones; spiroorthocarbonate compound, cyclic carbonate compound; vinyl compounds such as ethylene glycol divinyl ether, alkyl vinyl ether, 3,4-dihydropyran-2-methyl(3,4-dihydropyran-2-carboxylate), triethylene glycol divinyl ether, and the like; ethylenic unsaturated compounds such as styrene, vinylcyclohexene, isobutylene, polybutadiene, and the like; and the abovementioned derivatives, and the like.

Further, there is no particular restriction on the oligomers which form the transparent solid substance. As examples, there may be mentioned oligomers obtained by polymerizing several monomers described above.

As monomers and oligomers that form polymers, the transparent solid substance, they are preferably those that may be cured by active energy rays (e.g. visible light, ultraviolet light, electron beam, and the like). As such examples, the above-described monomers and oligomers are mentioned. Further, publicly known monomers and oligomers may also be mentioned, such as those described in "UV Curing Technology Data Book-Materials Edition" (Published Dec. 5, 2000, Technonet Co., Tokyo).

Specifically, among monomers and oligomers mentioned above, various (meth)acrylates are preferably used.

The transparent solid substance is preferably obtained by curing a monomer, an oligomer, or a polymerizable (or curable) composition comprising monomers and oligomers by using active energy rays (e.g. visible light, ultraviolet light, electron beam, and the like).

As a polymerization (or curing) catalyst (hereafter, also referred to as a polymerization initiator) to polymerize or cure the monomer or oligomer, there are mentioned active energy ray polymerization initiators (e.g. an ultraviolet ray polymerization initiator, a photo-polymerization initiator, and the like). The active energy ray polymerization initiators include a radical polymerization initiator and a cationic polymerization initiator that may initiate radical and cationic polymerization, respectively, when they are irradiated by energy rays. These polymerization initiators are used singly or in a combination of two or more kinds.

There is no restriction on the radical polymerization initiators that initiate radical polymerization upon irradiation by energy rays. As examples are mentioned ketone compounds such as acetophenones, benzyls, benzophenones, thioxanthones, and the like.

As acetophenones, there are mentioned, for example, diethoxy acetophenone, 2-hydroxy-2-methyl-1-phenylpropan-1-one, 4'-isopropyl-2-hydroxy-2-methylpropiophenone, 2-hydroxymethyl-2-methylpropiophenone, 2,2-dimethoxy-1,2-diphenylethan-1-one, p-dimethylaminoacetophenone, p-tert-butyldichloroacetophenone, p-tert-butyltrichloroacetophenone, p-azidobenzalacetophenone, 1-hydroxycyclohexylphenylketone, 2-methyl-1-[4-(methylthio)phenyl]-2-morpholinopropanone-1,2-benzyl-2-dimethylamino-1-(4-morpholinophenyl)butanone-1, benzoin, benzoin methyl ether, benzoin ethyl ether, benzoin isopropyl ether, benzoin n-butyl ether, benzoin isobutyl ether, and the like.

As benzyls, there are mentioned benzil, anisil, and the like.

As benzophenones, there are mentioned, for example, benzophenone, methyl o-benzoylbenzoate, Michler's ketone, 4,4'-bisdiethylaminobenzophenone, 4,4'-dichlorobenzophenone, 4-benzoyl-4'-methyldiphenyl sulfide, and the like.

As thioxanthones are mentioned thioxanthone, 2-methylthioxanthone, 2-ethylthioxanthone, 2-chlorothioxanthone, 2-isopropylthioxanthone, 2,4-diethylthioxanthone, and the like.

Other energy ray sensitive radical polymerization initiators include (2,4,6-trimethylbenzoyl)diphenylphosphine oxide, bis(cyclopentadienyl)-bis[2,6-difluoro-3-(pyl-1-yl)]titanium, and the like.

Further, there is no restriction on the cationic polymerization initiators which can initiate cationic polymerization upon energy ray irradiation. As examples are mentioned aromatic iodonium salts, aromatic sulfonium salts, iron-arene complexes, and the like. Specifically, there are mentioned, for example, aryl diazonium salts such as phenyldiazonium hexafluorophosphate, 4-methoxyphenyldiazonium hexafluoroantimonate, 4-methylphenyldiazonium hexafluorophosphate; diaryliodonium salts such as diphenyliodonium hexafluoroantimonate, di(4-methylphenyl)iodonium hexafluorophosphate, di(4-tert-butylphenyl)iodonium hexafluorophosphate, tolylcumyliodonium tetrakis(pentafluorophenyl)borate; triarylsulfonium salts such as triphenylsulfonium hexafluoroantimonate, tris(4-methoxyphenyl) sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bis(hexafluoroantimonate), 4,4'-bis(diphenylsulfonio)phenylsulfide bis(hexafluorophosphate), 4,4'-bis[di($\beta$-hydroxyethoxy)phenylsulfonio]phenylsulfide bis(hexafluoroantimonate), 4,4'-bis[di($\beta$-hydroxyethoxy)phenylsulfonio]phenylsulfide bis(hexafluorophosphate), 4-[4'-(benzoyl)phenylthio]phenyl-di(4-fluorophenyl)sulfonium hexafluoroantimonate, 4-[4'-(benzoyl)phenylthio]phenyl-di(4-fluorophenyl)sulfonium hexafluorophosphate, 4-(2-chloro-4-benzoylphenylthio)phenyl-di(4-fluorophenyl)sulfonium hexafluoroantimonate; iron-arene complexes such as ($\eta$5-2,4-cyclopentadien-1-yl)[(1,2,3,4,5,6-$\eta$)-(1-methylethyl)benzene]iron hexafluorophosphate and the like; mixture of aluminum complexes and silanols where the aluminum complexes include tris(acetylacetonato)aluminum, tris(ethylacetonatoacetato)aluminum, tris(salicylaldehydato)aluminum, and the like, and the silanols include triphenylsilanol and the like.

Hereafter, details of the light-modulating liquid-crystal element of the present invention will be further described.

The light-modulating liquid-crystal element of the present invention is cloudy (or white turbid) in the absence of an electric field, because incident light is scattered due to the difference in the refractive indices between the aforementioned transparent solid substance and the aforementioned nematic liquid-crystal material, and other factors. On the other hand, when an electric field is applied, the liquid crystals align in the direction of the electric field and the refractive indices of the transparent solid substance and nematic liquid-crystal material become similar, resulting in a transparent state. When the electric field is turned off, the element returns to the original cloudy state.

Further, there are two components in the refractive index of the liquid-crystals. One is an extraordinary light refractive index ($n_e$) and the other is an ordinary light refractive index ($n_o$). From these two components, the refractive index anisotropy ($\Delta n$) and an average refractive index (n(average)) are obtained. In the light-modulating liquid-crystal element of the present invention, the haze value (Haze) before application of an electric field, namely, that of the cloudy (or white turbid) state is affected by the average refractive index; the larger the difference between the average refractive index of the nematic liquid-crystal material and the refractive index of the transparent solid material, the stronger is the haze value (Haze), which is preferable. Furthermore, under application of an electric field, the closer the ordinary refractive index ($n^o$) of the nematic liquid-crystal material and refractive index of the transparent solid material (expressed as $n_p$), the higher the transparency, which is preferable. In summary, it is preferable for the nematic liquid-crystal material of the present invention to have an ordinary light refractive index ($n_o$) close to that ($n_p$) of the transparent solid substance, and at the same time to have a larger extraordinary light refractive index ($n_e$) (larger $\Delta n$=larger n(average))

Further, the haze value (Haze) of the light-modulating liquid-crystal element of the present invention is, in the absence of an electric field, namely, in a cloudy (or white turbid) state, preferably 60% or larger and more preferably 70% or larger, and when the electric field is on, namely in a transparent state, the haze value is preferably 5% or less and more preferably 1% or less. The difference in the haze values when the electric field is off [a cloudy (or white turbid) state] and that when the electric field is on (a transparent state) is preferably 60% or larger and more preferably 70% or larger, from the standpoint of contrast.

Further, the parallel light transmittance (Tp (%)) of the light-modulating liquid-crystal element of the present invention is preferably 15% or less and more preferably 10% or less, when no electric field is applied [in a cloudy (or white turbid) state], and under application of an electric field (in a transparent state), the transmittance is preferably 80% or higher and more preferably 85% or higher. The difference in the parallel light transmittance without [a cloudy (or white turbid) state] and with (a transparent state) application of an electric field is preferably 65% or higher and more preferably 70% or higher from the standpoint of contrast.

In the aforementioned nematic liquid-crystal material used for the light-modulating liquid-crystal element of the present invention, transmittance of parallel light in the absence of electric voltage applied is defined 100%, and as the voltage is increased, the parallel transmittance is reduced to 0%. In addition, when the parallel light transmittance is th %, the applied voltage is expressed as $V_{th}$. Specifically, for example, the applied voltage is expressed as $V_{10}$ when the transmittance of parallel light is 90%, and when transmittance becomes 10%, the applied voltage is expressed as $V_{90}$. After fabrication of the element, $V_{10}$ is preferably 50 V or less and more preferably 20 V or less from the standpoint of durability of the element. However, this value may vary greatly depending on the kind of transparent solid substance and not limited by the value.

In the light-modulating liquid-crystal element of the present invention, the aforementioned nematic liquid-crystal material is dispersed in the aforementioned transparent solid substance as independent microdroplets and its average particle diameter is in the range of 0.1 to 50 μm. The average diameter of the micro-particles is preferably 0.5 to 20 μm and more preferably 2 to 8 μm, from the standpoint of light scattering efficiency, driving voltage, and low temperature driving. When the diameter is less than 0.1 μm, the incident light becomes difficult to be scattered and the cloudy (or white turbid) state becomes insufficient in the absence of applied electric field, and when it exceeds 50 μm, the number of the microdroplets decreases, resulting in decrease in the reflection efficiency.

When the light-modulating liquid-crystal element of the present invention is irradiated with 0.8 mW/cm² ultraviolet light (wavelength, 300 to 400 nm) for 350 hours by an accelerated weather meter, the change in yellowness before and after irradiation (Δb* in the L*a*b* color specification) is preferably 1.5 or less and more preferably 1.0 or less. The yellowness in this invention refers to b* in the L*a*b* color specification system. The change in the yellowness corresponds to the difference in the yellowness values obtained by subtracting the b* value before irradiation from the value after irradiation for the light-modulating liquid-crystal element tested by irradiating 0.8 mW/cm² ultraviolet light (300-400 nm) for 350 hours by an accelerated weather meter, and is expressed by Δb*.

In the following, the method for manufacturing the light-modulating crystal liquid element of the present invention will be described in detail.

There is no particular restriction on the method for manufacturing the light-modulating element of the present invention. However, as a preferable method for manufacturing, one case will be described in detail, wherein a polymerizable (or curable) composition cured by active energy rays (e.g. visible light, ultraviolet light, electron beam, and the like) is used as the transparent solid substance.

First, between two substrates with electrode layers, at least one of which being transparent, the nematic liquid-crystal material and a polymerizable (or curable) composition curable by active energy rays (e.g. visible light, ultraviolet light, electron beam, and the like) are placed as essential components. As described above, this polymerizable (or curable) composition contains one kind or more of monomer or oligomer, and further contains optional components such as a polymerization catalyst (or polymerization initiator, curing catalyst), a chain transfer agent, a photosensitizer, a cross-linking agent, a solvent (for example, organic solvent, water, water soluble solvent), a synthetic resin, and the like.

When the nematic liquid-crystal material and the polymerizable (or curable) composition are placed between the substrates, the two components are preferably mixed before placement, and the two components are preferably mixed homogeneously in the mixed state.

Thereafter, an active energy ray (e.g. visible light, ultraviolet light, electron beam, and the like) is irradiated through the transparent substrate to polymerize (or cure) the monomer or oligomer in the polymerizable composition and, during the polymerization process, it is preferable to phase-separate the liquid-crystal component. The phase-separated nematic liquid-crystal material is dispersed in the polymerized (or cured) transparent solid substance as independent microdroplets with an average particle diameter of 0.1 to 50 μm.

The thickness of the light-modulating liquid-crystal layer of the present invention is optionally adjusted, ordinarily in the range of 1 to 100 μm. However, from the standpoint of driving voltage, and transparency and transmittance under application of voltage, the thickness is preferably 50 μm or less and more preferably 5 to 20 μm.

As the substrate of the light-modulating liquid-crystal element of the present invention, glass and plastic films are mentioned. These are preferably transparent and may be a laminate of two or more materials of different or the same kind.

An electrode layer is necessary on the inner surface of the substrate. The thickness of the electrode layer is preferably 0.01 to 1 μm. The electrode is preferably a transparent conductive layer, and as the conductive layer, ITO film is preferable. As the substrate, it is preferable to use glass substrates and durable plastic films such as polycarbonate and the like, all having ITO films on the surface.

The light-modulating liquid-crystal element of the present invention may be used in applications such as a display device (display), a holographic material, a light-modulating material, and is particularly suitable as a light-modulating material in a construction materials application.

EXAMPLES

The present invention will be further described below in terms of examples, but the present invention is not limited by these examples.

Examples 1 to 5 and Comparative Examples 1 to 6

The light-modulating liquid-crystal elements were prepared according to the mixing ratio and preparative method described below. Further, as the nematic liquid-crystal material, the following liquid-crystal compositions 1 to 5 were used for Examples 1 to 5, respectively, and the following comparative compositions 1 to 6 were used for Comparative Examples 1 to 6, respectively.

| (Mixing Ratio) | |
| --- | --- |
| LIGHT-ACRYLATE IM-A (produced by Kyoeisha Chemical. Co., Ltd.) | 8 parts by mass |
| LIGHT-ACRYLATE HPP-A (produced by Kyoeisha Chemical. Co., Ltd.) | 20 parts by mass |
| Laromer LR8987 (produced by BASF Corp.) | 10 parts by mass |
| Laromer LR8983 (produced by BASF Corp.) | 10 parts by mass |
| Darocure 1173 (produced by Ciba Specialty Chemicals) | 2 parts by mass |
| Nematic Liquid-crystal Material (refer to the following Liquid-crystal Compositions 1 to 5, and Comparative Compositions 1 to 6) | 50 parts by mass |

(Preparative Method)

Into a space of 20 μm provided between two substrates, the mixture prepared according to the above mixing ratio was placed and polymerized in an ultraviolet curing unit under the condition of 0.75 (mW/cm$^2$)×600 (sec) [dose: 450 (mJ/cm$^2$)] to form a light-modulating layer and, thus, a light-modulating liquid-crystal element was obtained. Here, the two substrates were 1 mm in thickness, had 0.1 μm-thick ITO films as the electrode layers, and were both transparent.

The cross-sectional surface of the light-modulating liquid-crystal element thus obtained was observed with a scanning electron microscope. It was shown that, in EXAMPLES 1 to 5, the nematic liquid-crystal material was homogeneously dispersed in the transparent solid substance (a polymer) as independent microdroplets, with a particle diameter of 0.5 to 5 μm. In Comparative Examples 1 to 6, the nematic liquid-crystal material was dispersed in the transparent solid material (a polymer) nearly homogeneously but the particle diameter was 5 to 50 μm.

Of the nematic liquid-crystal material used and the light-modulating liquid-crystal element obtained, the following various characteristic values were measured, storage stability was evaluated, and light resistance was tested.

(Measurement of Various Characteristic Values and Evaluation of Storage Stability)

Of the nematic liquid-crystal material used for the light-modulating liquid-crystal element, the transition temperature (NI point), dielectric anisotropy (Δ∈), ordinary light refractive index component ($n_o$), extraordinary light refractive index component ($n_e$), difference between the latter two values (Δn), and threshold voltage ($V_{10}$) were measured. Further, of the light-modulating liquid-crystal element obtained, haze value (Haze) and parallel light transmittance (Tp (%)) were measured in the absence of an electric field [OFF: cloudy (or white turbid) state] and with application of an electric field (ON: transparent state).

Further, storage stability of the nematic liquid-crystal material was evaluated as follows. After storage of the nematic liquid-crystal material at −20° C. for 14 days, those which showed precipitation, crystallization, turbidity, or the like were marked "poor" and those which did not change were marked "good".

These results are shown in Table 1.

(Light Resistance Test)

The light-modulating liquid-crystal element was irradiated with ultraviolet light (wavelength, 300 to 400 nm) with intensity of 0.8 mW/cm$^2$ for 350 hours by means of an accelerated weather meter. The values of L*, a*, and b* in the L*a*b* color specification system were measured before (initial) and after the weathering test (after UV exposure), and from these values, the change in yellowness, Δb* was calculated. These results are shown in Table 2.

[Formula 34]

| Liquid-crystal Composition 1 | % by mass |
| --- | --- |
| 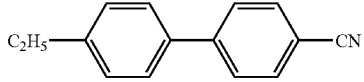 | 6.0 |
| 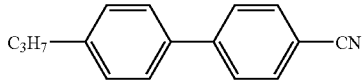 | 6.0 |
| 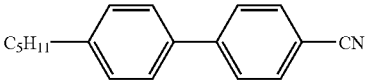 | 9.0 |
| 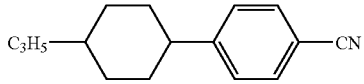 | 15.0 |
| 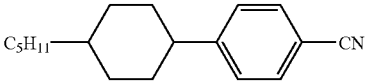 | 15.0 |
| 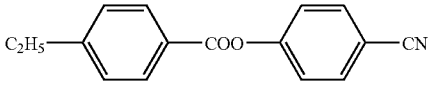 | 2.0 |

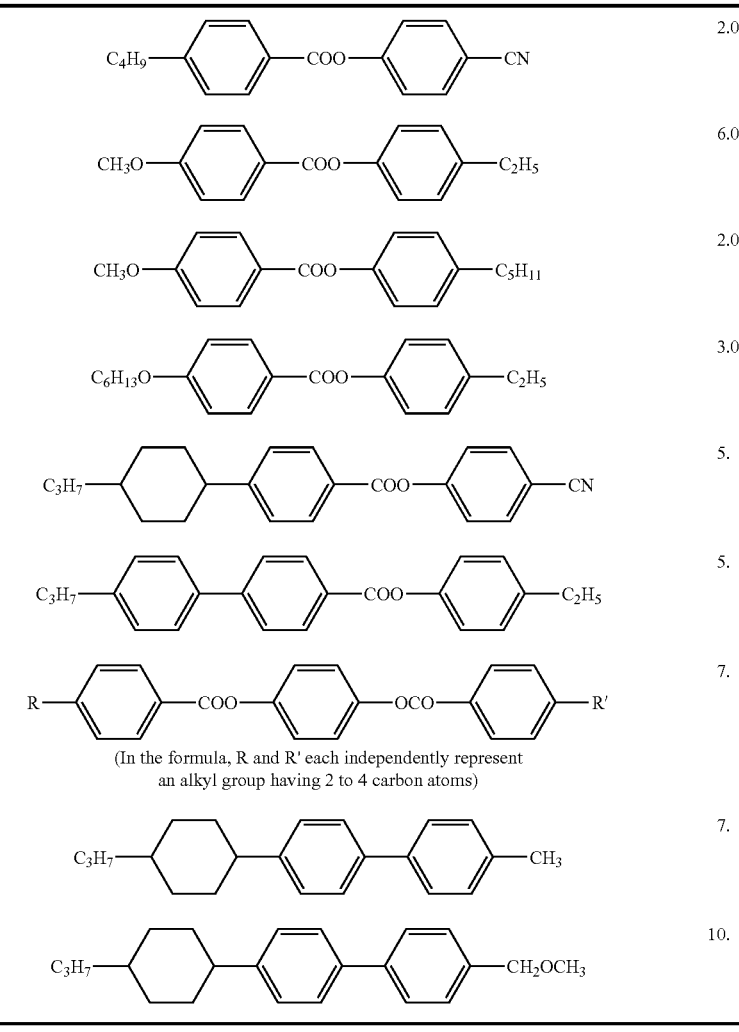

-continued
| Structure | Value |
|---|---|
| 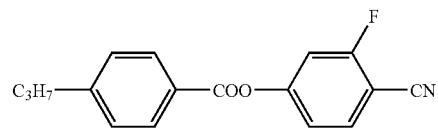 | 0.64 |
| 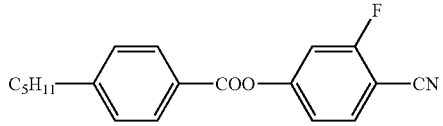 | 0.85 |
| 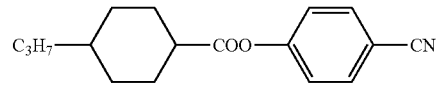 | 1.84 |
| 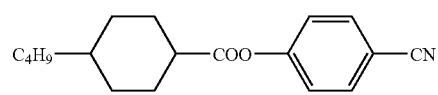 | 1.84 |
| 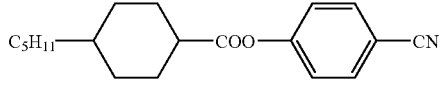 | 1.84 |
| 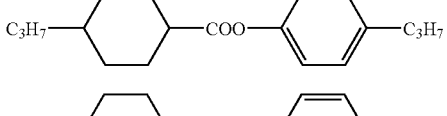 | 2.07 |
|  | 2.07 |
| 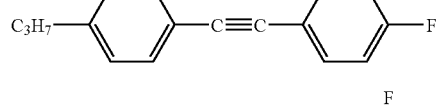 | 8.94 |
| 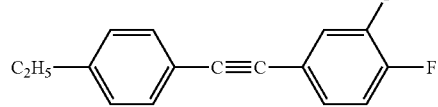 | 8.78 |
| 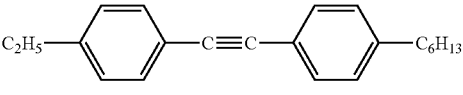 | 19.80 |
| 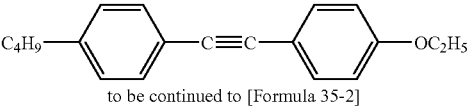 | 0.495 |
to be continued to [Formula 35-2]
[Formula 35-2]
| Structure | Value |
|---|---|
| 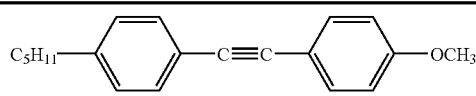 | 0.66 |
| 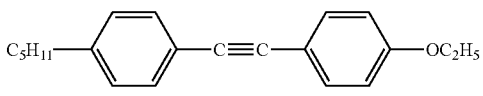 | 0.495 |
| 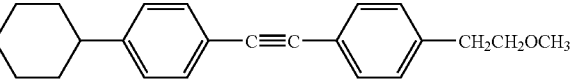 | 1.35 |

-continued

| Structure | % |
|---|---|
| C₃H₇–[Cy]–[Ph]–C≡C–[Ph]–CH₂CH₂OCH₃ | 8.91 |
| C₄H₉–[Cy]–[Ph]–C≡C–[Ph]–CH₂CH₂OCH₃ | 0.75 |
| C₃H₇–[Cy]–[Cy]–COO–[Ph]–CH₂CH₂OCH₃ | 5.74 |
| C₃H₇–[Cy]–[Ph]–COO–[Ph]–CN | 0.75 |
| R–[Cy]–COO–[Ph]–OCO–[Cy]–R' | 9.98 |

(In the formula, R and R' each independently represents an alkyl group having 2 to 4 carbon atoms

| Structure | % |
|---|---|
| R–[Ph]–COO–[Ph]–OCO–[Ph]–R' | 4.04 |

(In the formula, R and R' each independently represents an alkyl group having 2 to 4 carbon atoms

| Structure | % |
|---|---|
| R–[Ph]–COO–[Ph]–[Ph]–OCO–[Ph]–R' | 4.89 |

(In the formula, R and R' each independently represents an alkyl group having 2 to 4 carbon atoms

| Structure | % |
|---|---|
| C₃H₇–[Cy]–[Cy]–COO–[Ph]–[Cy]–C₃H₇ | 0.45 |
| C₃H₇–[Cy]–[Ph]–[Ph]–CH₃ | 1.80 |

[Formula 36]

| Liquid-crystal Compositions 2 | % by mass |
|---|---|
| C₂H₅–[Ph]–[Ph]–CN | 6.0 |
| C₃H₇–[Ph]–[Ph]–CN | 4.0 |
| C₅H₁₁–[Ph]–[Ph]–CN | 12.0 |
| C₇H₁₅–[Ph]–[Ph]–CN | 6.0 |
| C₃H₅–[Cy]–[Ph]–CN | 15.0 |

-continued

| Structure | % |
|---|---|
| C₅H₁₁–⟨cyclohexyl⟩–⟨phenyl⟩–CN | 15.0 |
| C₂H₅–⟨phenyl⟩–COO–⟨phenyl⟩–CN | 4.0 |
| C₄H₉–⟨phenyl⟩–COO–⟨phenyl⟩–CN | 2.0 |
| C₃H₇–⟨cyclohexyl⟩–COO–⟨phenyl⟩–OC₄H₉ | 1.67 |
| C₄H₉–⟨cyclohexyl⟩–COO–⟨phenyl⟩–OC₂H₅ | 1.67 |
| C₅H₁₁–⟨cyclohexyl⟩–COO–⟨phenyl⟩–OCH₃ | 1.67 |
| C₃H₇–⟨cyclohexyl⟩–⟨phenyl⟩–COO–⟨phenyl⟩–CN | 3.0 |
| C₃H₇–⟨phenyl⟩–⟨phenyl⟩–COO–⟨phenyl⟩–C₂H₅ | 5.0 |
| C₃H₇–⟨phenyl⟩–⟨phenyl⟩–COO–⟨phenyl⟩–CN | 5.0 |
| R–⟨phenyl⟩–COO–⟨phenyl⟩–OCO–⟨phenyl⟩–R'  (In the formula, R and R' each independently represents an alkyl group having 2 to 4 carbon atoms) | 7.0 |
| C₃H₇–⟨cyclohexyl⟩–⟨phenyl⟩–⟨phenyl⟩–CH₃ | 5.0 |
| C₅H₁₁–⟨cyclohexyl⟩–⟨phenyl⟩–⟨phenyl⟩–CN | 6.0 |

[Formula 37-1]

| Comparative Composition 2 | % by mass |
|---|---|
| C₂H₅–⟨phenyl⟩–⟨phenyl⟩–CN | 0.625 |
| C₂H₅–⟨phenyl⟩–COO–⟨phenyl⟩–CN | 6.5 |
| C₃H₇–⟨phenyl⟩–COO–⟨phenyl⟩–CN | 1.5 |

-continued

| Structure | Value |
|---|---|
| C₄H₉–⟨C₆H₄⟩–COO–⟨C₆H₄⟩–CN | 2.625 |
| C₂H₅–⟨C₆H₄⟩–COO–⟨C₆H₃(F)⟩–CN | 1.0 |
| C₃H₇–⟨C₆H₄⟩–COO–⟨C₆H₃(F)⟩–CN | 0.375 |
| C₅H₁₁–⟨C₆H₄⟩–COO–⟨C₆H₃(F)⟩–CN | 0.5 |
| C₃H₇–⟨Cy⟩–COO–⟨C₆H₄⟩–CN | 1.08 |
| C₄H₉–⟨Cy⟩–COO–⟨C₆H₄⟩–CN | 1.08 |
| C₅H₁₁–⟨Cy⟩–COO–⟨C₆H₄⟩–CN | 1.08 |
| C₃H₇–⟨Cy⟩–COO–⟨C₆H₄⟩–C₃H₇ | 1.625 |
| C₅H₁₁–⟨Cy⟩–COO–⟨C₆H₄⟩–C₅H₁₁ | 1.625 |
| C₃H₇–⟨C₆H₄⟩–C≡C–⟨C₆H₃(F)⟩–F | 9.375 |
| C₂H₅–⟨C₆H₄⟩–C≡C–⟨C₆H₃(F)⟩–F | 8.875 |
| C₂H₅–⟨C₆H₄⟩–C≡C–⟨C₆H₄⟩–C₆H₁₃ | 17.0 |
| C₄H₉–⟨C₆H₄⟩–C≡C–⟨C₆H₄⟩–OC₂H₅ | 1.65 | to be continued to [Formula 37-2]

[Formula 37-2]

| Structure | Value |
|---|---|
| 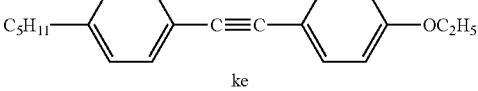 C₅H₁₁–⟨⟩–C≡C–⟨⟩–OCH₃ | 2.2 |
| 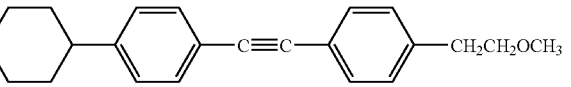 C₅H₁₁–⟨⟩–C≡C–⟨⟩–OC₂H₅ (ke) | 1.65 |
| 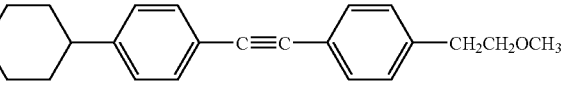 C₂H₅–⟨H⟩–⟨⟩–C≡C–⟨⟩–CH₂CH₂OCH₃ | 4.5 |
| 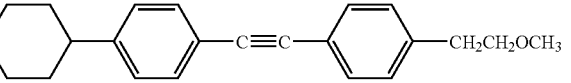 C₃H₇–⟨H⟩–⟨⟩–C≡C–⟨⟩–CH₂CH₂OCH₃ | 8.125 |
| 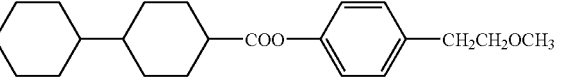 C₄H₉–⟨H⟩–⟨⟩–C≡C–⟨⟩–CH₂CH₂OCH₃ | 2.5 |
| 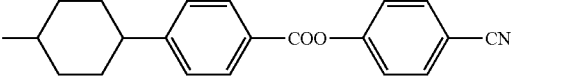 C₃H₇–⟨H⟩–⟨H⟩–COO–⟨⟩–CH₂CH₂OCH₃ | 3.375 |
| 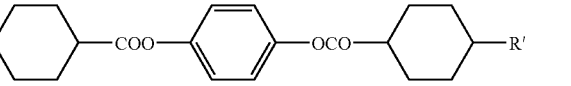 C₃H₇–⟨H⟩–⟨⟩–COO–⟨⟩–CN | 2.5 |
| 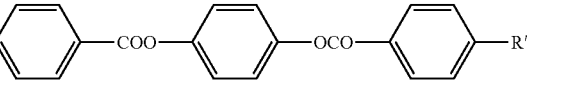 R–⟨H⟩–COO–⟨⟩–OCO–⟨H⟩–R′<br>(In the formula, R and R″ each independently represents an alkyl group having 2 to 4 carbon atoms) | 5.875 |
| 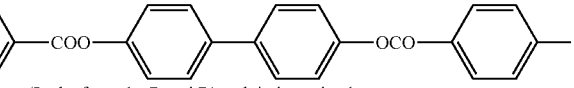 R–⟨⟩–COO–⟨⟩–OCO–⟨⟩–R′<br>(In the formula, R and R′ each independently represents an alkyl group having 2 to 4 carbon atoms) | 2.375 |
| 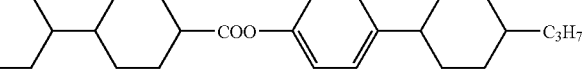 R–⟨⟩–COO–⟨⟩–⟨⟩–OCO–⟨⟩–R′<br>(In the formula, R and R′ each independently represents an alkyl group having 2 to 4 carbon atoms) | 2.875 |
| 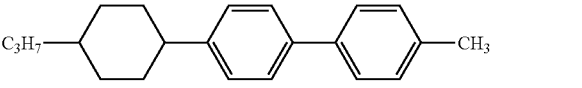 C₃H₇–⟨H⟩–⟨H⟩–COO–⟨⟩–⟨H⟩–C₃H₇ | 1.5 |
| 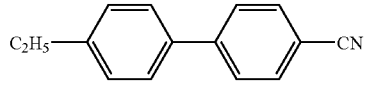 C₃H₇–⟨H⟩–⟨⟩–⟨⟩–CH₃ | 6.0 |

[Formula 38]

| Liquid-crystal Compositions 3 | % by mass |
|---|---|
| 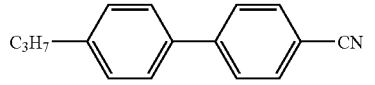 C₂H₅–⟨⟩–⟨⟩–CN | 8.0 |
| C₃H₇–⟨⟩–⟨⟩–CN | 6.0 |

-continued

| Structure | % |
|---|---|
| C₅H₁₁—⟨⟩—⟨⟩—CN | 8.0 |
| C₇H₁₅—⟨⟩—⟨⟩—CN | 10.0 |
| C₃H₇—⟨cy⟩—⟨⟩—CN | 12.5 |
| C₅H₁₁—⟨cy⟩—⟨⟩—CN | 12.5 |
| C₂H₅—⟨⟩—COO—⟨⟩—CN | 4.0 |
| C₄H₉—⟨⟩—COO—⟨⟩—CN | 2.0 |
| CH₃O—⟨⟩—COO—⟨⟩—C₂H₅ | 6.0 |
| C₃H₇—⟨cy⟩—⟨⟩—COO—⟨⟩—CN | 3.0 |
| C₃H₇—⟨⟩—⟨⟩—COO—⟨⟩—C₂H₅ | 5.0 |
| C₃H₇—⟨⟩—⟨⟩—COO—⟨⟩—CN | 5.0 |
| R—⟨⟩—COO—⟨⟩—OCO—⟨⟩—R' | 7.0 |
| (In the formula, R and R' each independently represents an alkyl group having 2 to 4 carbon atoms) | |
| C₃H₇—⟨cy⟩—⟨⟩—⟨⟩—CH₃ | 5.0 |
| C₅H₁₁—⟨cy⟩—⟨⟩—⟨⟩—CN | 6.0 |

[Formula 39]

| Comparative Composition 3 | % by mass |
|---|---|
| C₂H₅—⟨⟩—⟨⟩—CN | 8.0 |
| C₃H₇—⟨⟩—⟨⟩—CN | 6.0 |

-continued
| | |
|---|---|
| 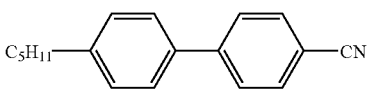 | 8.0 |
| 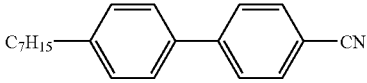 | 10.0 |
| 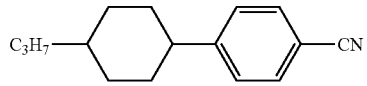 | 12.5 |
| 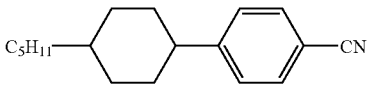 | 12.5 |
| 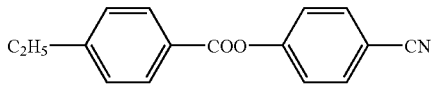 | 4.0 |
| 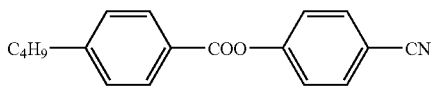 | 2.0 |
| 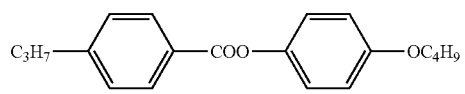 | 1.0 |
| 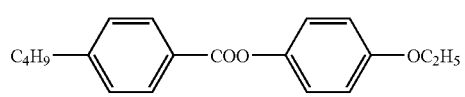 | 1.0 |
| 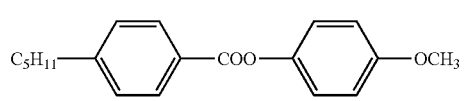 | 1.0 |
| 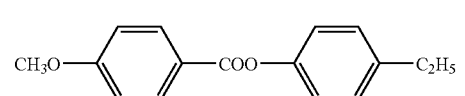 | 6.0 |
| 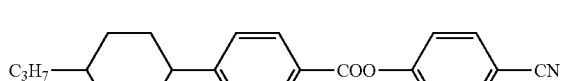 | 5.0 |
| 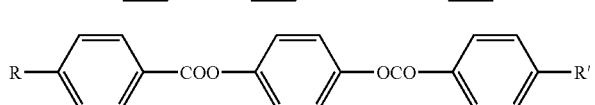<br>(In the formula, R and R' each independently represents an alkyl group having 2 to 4 carbon atoms) | 7.0 |
| 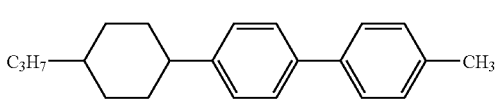 | 3.0 |
| 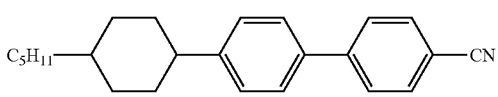 | 5.0 |
| 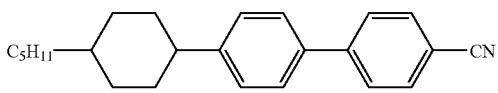 | 8.0 |

-continued

[Formula 40]

| Liquid-crystal Compositions 4 | % by mass |
|---|---|
| $C_2H_5$—⟨⟩—⟨⟩—CN | 8.0 |
| $C_3H_7$—⟨⟩—⟨⟩—CN | 6.0 |
| $C_5H_{11}$—⟨⟩—⟨⟩—CN | 12.0 |
| $C_7H_{15}$—⟨⟩—⟨⟩—CN | 10.0 |
| $C_3H_5$—⟨⟩—⟨⟩—CN | 15.0 |
| $C_5H_{11}$—⟨⟩—⟨⟩—CN | 15.0 |
| $C_3H_7$—⟨⟩—⟨⟩—COO—⟨⟩—CN | 5.0 |
| $C_3H_7$—⟨⟩—⟨⟩—COO—⟨⟩—$C_2H_5$ | 3.0 |
| $C_3H_7$—⟨⟩—⟨⟩—COO—⟨⟩—CN | 5.0 |
| $C_3H_7$—⟨⟩—COO—⟨⟩—COO—⟨⟩—CN | 1.33 |
| $C_4H_9$—⟨⟩—COO—⟨⟩—COO—⟨⟩—CN | 1.33 |
| $C_5H_{11}$—⟨⟩—COO—⟨⟩—COO—⟨⟩—CN | 1.33 |
| $C_3H_7$—⟨⟩—⟨⟩—⟨⟩—$CH_3$ | 4.0 |
| $C_5H_{11}$—⟨⟩—⟨⟩—⟨⟩—CN | 9.0 |
| $C_5H_{11}$—⟨⟩—⟨⟩—⟨⟩—CN | 4.0 |

[Formula 41-4]

| Comparative Composition 4 | % by mass |
|---|---|
| $C_2H_5$—⟨benzene⟩—COO—⟨benzene⟩—CN | 6.0 |
| $C_3H_7$—⟨benzene⟩—COO—⟨benzene⟩—CN | 2.5 |
| $C_4H_9$—⟨benzene⟩—COO—⟨benzene⟩—CN | 3.5 |
| $C_2H_5$—⟨benzene⟩—COO—⟨benzene(F)⟩—CN | 3.5 |
| $C_3H_7$—⟨benzene⟩—COO—⟨benzene(F)⟩—CN | 5.0 |
| $C_5H_{11}$—⟨benzene⟩—COO—⟨benzene(F)⟩—CN | 5.0 |
| $H_3C$—⟨benzene⟩—COO—⟨benzene⟩—$C_2H_5$ | 5.5 |
| $C_3H_7$—⟨benzene⟩—C≡C—⟨benzene(F,F)⟩ | 8.0 |
| $C_2H_5$—⟨benzene⟩—C≡C—⟨benzene(F,F)⟩ | 7.5 |
| $C_2H_5$—⟨benzene⟩—C≡C—⟨benzene⟩—$C_6H_{13}$ | 6.0 |
| $C_4H_9$—⟨benzene⟩—C≡C—⟨benzene⟩—$OC_2H_5$ | 4.2 |
| $C_5H_{11}$—⟨benzene⟩—C≡C—⟨benzene⟩—$OCH_3$ | 5.6 |
| $C_5H_{11}$—⟨benzene⟩—C≡C—⟨benzene⟩—$OC_2H_5$ | 4.2 | to be continued to [Formula 41-2]

[Formula 41-2]
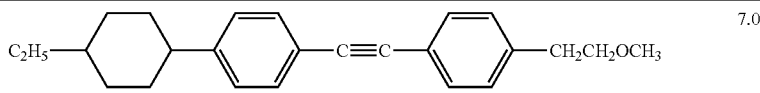 7.0
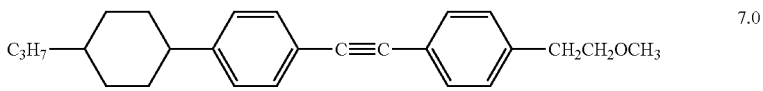 7.0
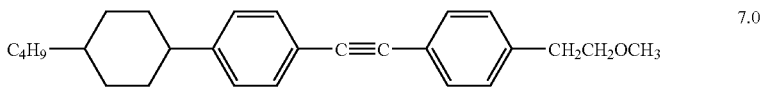 7.0
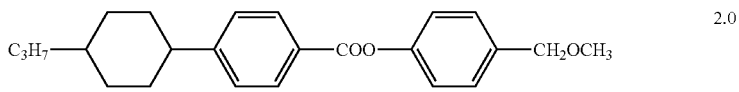 2.0
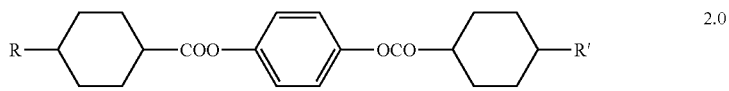 2.0
(In the formula, R and R' each independently represents an alkyl group having 2 to 4 carbon atoms)
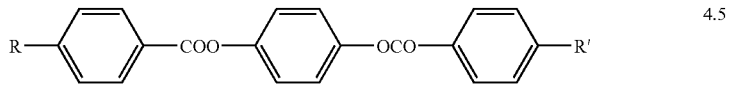 4.5
(In the formula, R and R' each independently represents an alkyl group having 2 to 4 carbon atoms)
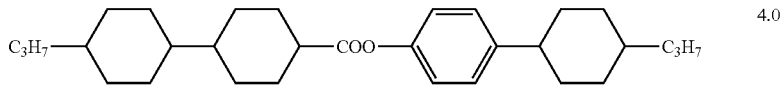 4.0
[Formula 42]
| Liquid-crystal Compositions 5 | % by mass |
|---|---|
| 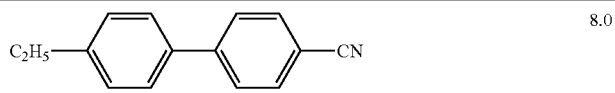 | 8.0 |
| 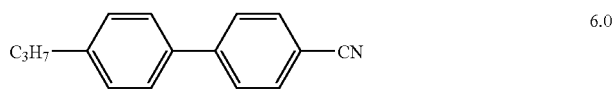 | 6.0 |
| 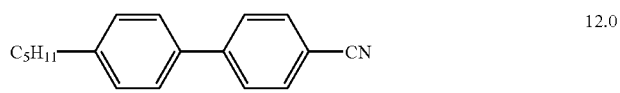 | 12.0 |
| 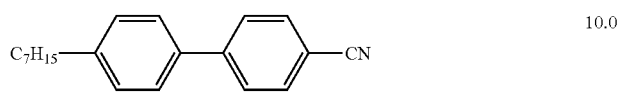 | 10.0 |
| 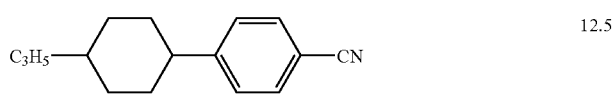 | 12.5 |
| 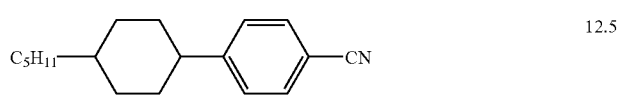 | 12.5 |
|  | 5.0 |

-continued

| Structure | % |
|---|---|
| C₄H₉–⌬–COO–⌬–CN | 4.0 |
| C₃H₇–(Cy)–⌬–COO–⌬–CN | 5.0 |
| C₃H₇–⌬–⌬–COO–⌬–C₂H₅ | 3.0 |
| C₃H₇–⌬–⌬–COO–⌬–CN | 5.0 |
| C₃H₇–(Cy)–⌬–⌬–CH₃ | 4.0 |
| C₅H₁₁–(Cy)–⌬–⌬–CN | 9.0 |
| C₅H₁₁–⌬–⌬–⌬–CN | 4.0 |

[Formula 43]

| Comparative Composition 5 | % by mass |
|---|---|
| C₂H₅–⌬–⌬–CN | 5.0 |
| C₂H₅–⌬–COO–⌬–CN | 7.0 |
| C₃H₇–⌬–COO–⌬–CN | 3.0 |
| C₄H₉–⌬–COO–⌬–CN | 4.0 |
| CH₃O–(Cy)–COO–⌬–C₂H₅ | 5.0 |
| C₃H₇–⌬–C≡C–⌬(3,4-F₂) | 9.0 |
| C₂H₅–⌬–C≡C–⌬(3,4-F₂) | 6.0 |

-continued

| Structure | % |
|---|---|
| C₂H₅—⟨benzene⟩—C≡C—⟨benzene⟩—C₆H₁₃ | 13.0 |
| C₄H₉—⟨benzene⟩—C≡C—⟨benzene⟩—OC₂H₅ | 3.9 |
| C₅H₁₁—⟨benzene⟩—C≡C—⟨benzene⟩—OCH₃ | 5.2 |
| C₅H₁₁—⟨benzene⟩—C≡C—⟨benzene⟩—OC₂H₅ | 3.9 |
| C₂H₅—⟨cyclohexane⟩—⟨benzene⟩—C≡C—⟨benzene⟩—CH₂CH₂OCH₃ | 9.0 |
| C₃H₇—⟨cyclohexane⟩—⟨benzene⟩—C≡C—⟨benzene⟩—CH₂CH₂OCH₃ | 7.0 |
| C₄H₉—⟨cyclohexane⟩—⟨benzene⟩—C≡C—⟨benzene⟩—CH₂CH₂OCH₃ | 5.0 |
| C₃H₇—⟨cyclohexane⟩—⟨benzene⟩—COO—⟨benzene⟩—CH₂OCH₃ | 2.0 |
| C₃H₇—⟨cyclohexane⟩—⟨cyclohexane⟩—COO—⟨benzene⟩—⟨cyclohexane⟩—C₃H₇ | 3.0 |
| C₃H₇—⟨cyclohexane⟩—⟨cyclohexane⟩—⟨benzene⟩—C₂H₅ | 5.0 |
| C₃H₇—⟨cyclohexane⟩—⟨cyclohexane⟩—⟨benzene⟩—OCH₃ | 4.0 |

[Formula 44]

| Comparative Composition 6 | % by mass |
|---|---|
| C₂H₅—⟨benzene⟩—⟨benzene⟩—CN | 14.0 |
| C₃H₇—⟨benzene⟩—⟨benzene⟩—CN | 14.3 |
| C₅H₁₁—⟨benzene⟩—⟨benzene⟩—CN | 13.6 |
| C₇H₁₅—⟨benzene⟩—⟨benzene⟩—CN | 12.9 |

-continued

| Structure | Value |
|---|---|
| C₃H₅–(cyclohexyl)–(phenyl)–CN | 5.8 |
| C₅H₁₁–(cyclohexyl)–(phenyl)–CN | 5.8 |
| C₄H₉–(phenyl)–C≡C–(phenyl)–OC₂H₅ | 2.55 |
| C₅H₁₁–(phenyl)–C≡C–(phenyl)–OC₂H₅ | 3.4 |
| C₅H₁₁–(phenyl)–C≡C–(phenyl)–OCH₃ | 2.55 |
| C₂H₅–(cyclohexyl)–COO–(phenyl)–(phenyl)–CN | 7.5 |
| C₃H₇–(cyclohexyl)–COO–(phenyl)–(phenyl)–CN | 3.7 |
| CH₃O–(phenyl)–COO–(phenyl)–(cyclohexyl)–C₃H₇ | 2.6 |
| CH₃O–(phenyl)–COO–(phenyl)–(cyclohexyl)–C₅H₁₁ | 2.1 |
| C₅H₁₁–(cyclohexyl)–(phenyl)–(phenyl)–CN | 9.3 |

TABLE 1

| | NI point | Refractive index | | | | | Storage stability | OFF Tp (%) | OFF Haze | ON Tp (%) | ON Haze |
| | | $N_e$ | $N_o$ | Δn | Δε | $V_{10}$ | | | | | |
|---|---|---|---|---|---|---|---|---|---|---|---|
| Example 1 | 85.2 | 1.6848 | 1.5124 | 0.1724 | 11.01 | 1.61 | good | 11.9 | 64.3 | 84.9 | 0.9 |
| Comparative Example 1 | 77.4 | 1.6807 | 1.5105 | 0.1702 | 6.38 | 1.71 | poor | 40.0 | 48.9 | 82.6 | 7.7 |
| Example 2 | 85.3 | 1.6932 | 1.5112 | 0.1820 | 13.12 | 1.53 | good | 9.1 | 60.1 | 86.4 | 0.4 |
| Comparative Example 2 | 78.6 | 1.6966 | 1.5138 | 0.1828 | 6.80 | 1.71 | poor | 39.7 | 47.3 | 83.7 | 7.3 |
| Example 3 | 83.1 | 1.7057 | 1.5158 | 0.1899 | 13.27 | 1.44 | good | 7.0 | 72.2 | 86.8 | 0.5 |
| Comparative Example 3 | 82.2 | 1.7071 | 1.5159 | 0.1912 | 14.06 | 2.11 | poor | 8.0 | 71.2 | 86.1 | 0.4 |
| Example 4 | 92.6 | 1.7129 | 1.5126 | 0.2003 | 13.80 | 1.63 | good | 7.0 | 78.0 | 87.1 | 0.4 |
| Comparative Example 4 | 84.3 | 1.7162 | 1.5166 | 0.1996 | 13.50 | 1.85 | poor | 39.4 | 46.5 | 85.3 | 4.5 |
| Example 5 | 85.7 | 1.7180 | 1.5150 | 0.2020 | 15.18 | 1.54 | good | 6.6 | 76.9 | 87.6 | 0.4 |
| Comparative Example 5 | 83.1 | 1.7195 | 1.5175 | 0.2020 | 8.50 | 1.69 | poor | 37.0 | 52.0 | 84.5 | 6.0 |
| Comparative Example 6 | 88.9 | 1.7348 | 1.5192 | 0.2156 | 12.90 | 1.59 | good | 6.3 | 81.3 | 84.4 | 1.5 |

TABLE 2

|  |  | Initial | | | After UV exposure | | | |
| --- | --- | --- | --- | --- | --- | --- | --- | --- |
|  |  | L* | a* | b* | L* | a* | b* | Δb* |
| Example 1 | OFF | 36.0 | 3.2 | 10.4 | 37.0 | 3.4 | 11.3 | 0.9 |
|  | ON | 94.2 | −0.6 | 2.6 | 94.0 | −0.8 | 3.0 | 0.4 |
| Comparative Example 1 | OFF | 78.7 | −0.5 | 5.5 | 78.3 | −2.3 | 11.9 | 6.4 |
|  | ON | 92.7 | −0.7 | 4.2 | 89.9 | −3.2 | 11.9 | 7.8 |
| Example 2 | OFF | 36.1 | 2.8 | 9.8 | 37.2 | 2.9 | 10.5 | 0.7 |
|  | ON | 93.5 | −0.5 | 2.8 | 93.1 | −0.7 | 3.2 | 0.4 |
| Comparative Example 2 | OFF | 77.6 | −0.4 | 5.8 | 77.2 | −2.1 | 13.5 | 7.7 |
|  | ON | 91.6 | −0.8 | 4.4 | 88.9 | −3.1 | 12.9 | 8.5 |
| Example 3 | OFF | 34.4 | 2.1 | 8.2 | 35.0 | 2.1 | 8.8 | 0.6 |
|  | ON | 91.0 | −0.3 | 3.6 | 90.7 | −0.8 | 4.0 | 0.4 |
| Comparative Example 3 | OFF | 69.4 | 0.0 | 6.7 | 70.6 | −1.3 | 7.3 | 0.6 |
|  | ON | 92.0 | −0.5 | 4.1 | 91.1 | −2.4 | 4.4 | 0.3 |
| Example 4 | OFF | 34.1 | 1.5 | 7.0 | 34.1 | 1.4 | 7.5 | 0.5 |
|  | ON | 94.2 | −0.1 | 4.6 | 93.9 | −1.0 | 5.1 | 0.6 |
| Comparative Example 4 | OFF | 59.3 | 0.5 | 7.7 | 62.5 | −0.3 | 13.8 | 6.1 |
|  | ON | 92.3 | −0.2 | 3.8 | 92.9 | −1.8 | 12.6 | 8.8 |
| Example 5 | OFF | 33.8 | 1.2 | 7.3 | 34.2 | 1.3 | 7.7 | 0.4 |
|  | ON | 94.2 | −0.2 | 4.9 | 94.0 | −1.0 | 5.5 | 0.6 |
| Comparative Example 5 | OFF | 59.5 | 0.5 | 7.5 | 63.4 | −0.1 | 13.5 | 6.0 |
|  | ON | 93.1 | −0.5 | 3.4 | 92.2 | −1.6 | 11.6 | 8.2 |
| Comparative Example 6 | OFF | 32.6 | 1.6 | 7.0 | 32.7 | 0.9 | 9.6 | 2.6 |
|  | ON | 94.2 | −0.7 | 2.7 | 93.6 | −2.4 | 7.3 | 4.6 |

INDUSTRIAL APPLICABILITY

The present invention provides a light-modulating liquid-crystal display element with sufficient contrast, which can be driven in a wide temperature range and has an particularly superior light resistance (or weather resistance).

The invention claimed is:

1. A light-modulating liquid-crystal element, comprising two substrates each of which have an electrode layer and at least one of which is transparent and a light-modulating layer supported between these substrates, the light-modulating layer being composed of a nematic liquid-crystal material and a transparent solid substance, the nematic liquid-crystal material containing one or more compounds selected from the compounds represented by the general formula (I) as component (a) and/or one or more compounds selected from the compounds represented by the general formula (II) as component (b), and one or more compounds selected from the compounds represented by the general formula (III) as component (c), the nematic liquid-crystal material being dispersed as independent microdroplets in the transparent solid substance, the microdroplets having an average particle diameter of 0.1 to 50 μm:

[Formula 1]

(I)

wherein R¹ is an alkyl group having 1 to 10 carbon atoms and optionally an ether bond or an alkoxy group having 1 to 10 carbon atoms, A¹ is trans-1,4-cyclohexylene or 1,4-phenylene;

[Formula 2]

(II)

wherein R² is an alkyl group having 1 to 10 carbon atoms and optionally an ether bond or an alkoxy group having 1 to 10 carbon atoms, A² is trans-1,4-cyclohexylene or 1,4-phenylene, X¹ is a cyano group, an alkyl group having 1 to 10 carbon atoms and optionally an ether bond, or an alkoxy group having 1 to 10 carbon atoms;

[Formula 3]

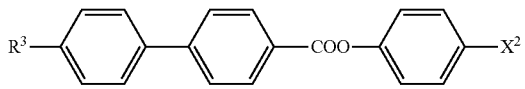

(III)

wherein R³ is an alkyl group having 1 to 10 carbon atoms and optionally an ether bond or an alkoxy group having 1 to 10 carbon atoms, and X² is a cyano group, an alkyl group having 1 to 10 carbon atoms and an ether bond.

2. The light-modulating liquid-crystal element according to claim 1, wherein the nematic liquid-crystal material contains no compound with a partial structure represented by the following general formula (IV):

[Formula 4]

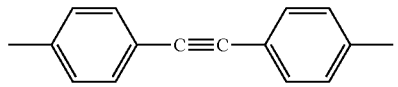

(IV)

wherein the benzene ring optionally has a plurality of substituents.

3. The light-modulating liquid-crystal element according to claim 1, wherein the change in yellowness index (Δb* in the L*a*b* color specification system) before and after irradiation with ultraviolet light (300 to 400 nm) of 0.8 mW/cm² for 350 hours by using an accelerated weather meter is 1.5 or less.

4. The light-modulating liquid-crystal element according to claim 2, wherein the change in yellowness index (Δb* in the L*a*b* color specification system) before and after irradiation with ultraviolet light (300 to 400 nm) of 0.8 mW/cm² for 350 hours by using an accelerated weather meter is 1.5 or less.

5. A light-modulating liquid-crystal element, comprising two substrates each of which have an electrode layer and at least one of which is transparent and a light-modulating layer supported between these substrates, the light-modulating layer consisting essentially of a nematic liquid-crystal material and a transparent solid substance, the nematic liquid-crystal material containing one or more compounds selected from the compounds represented by the general formula (I) as component (a) and/or one or more compounds selected from the compounds represented by the general formula (II) as component (b), and one or more compounds selected from the compounds represented by the general formula (III) as component (c), the nematic liquid-crystal material being dispersed as independent microdroplets in the transparent solid substance, the microdroplets having an average particle diameter of 0.1 to 50 μm:

[Formula 1]

(I)

wherein $R^1$ is an alkyl group having 1 to 10 carbon atoms and optionally an ether bond or an alkoxy group having 1 to 10 carbon atoms,
$A^1$ is trans-1,4-cyclohexylene or 1,4-phenylene;

[Formula 2]

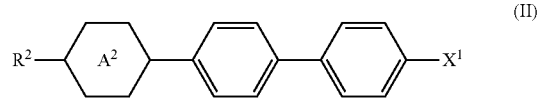
(II)

wherein $R^2$ is an alkyl group having 1 to 10 carbon atoms and optionally an ether bond or an alkoxy group having 1 to 10 carbon atoms,
$A^2$ is trans-1,4-cyclohexylene or 1,4-phenylene,
$X^1$ is a cyano group, an alkyl group having 1 to 10 carbon atoms and optionally an ether bond, or an alkoxy group having 1 to 10 carbon atoms;

[Formula 3]

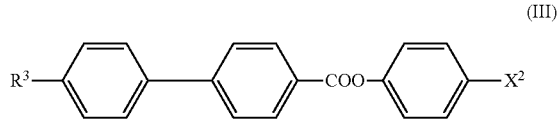
(III)

wherein $R^3$ is an alkyl group having 1 to 10 carbon atoms and optionally an ether bond or an alkoxy group having 1 to 10 carbon atoms, and
$X^2$ is a cyano group, an alkyl group having 1 to 10 carbon atoms and an ether bond.

6. The light-modulating liquid-crystal element according to claim 5, wherein the nematic liquid-crystal material contains no compound with a partial structure represented by the following general formula (IV):

[Formula 4]

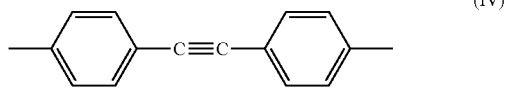
(IV)

wherein the benzene ring optionally has a plurality of substituents.

7. The light-modulating liquid-crystal element according to claim 5, wherein the change in yellowness index (Δb* in the L*a*b* color specification system) before and after irradiation with ultraviolet light (300 to 400 nm) of 0.8 mW/cm² for 350 hours by using an accelerated weather meter is 1.5 or less.

8. The light-modulating liquid-crystal element according to claim 6, wherein the change in yellowness index (Δb* in the L*a*b* color specification system) before and after irradiation with ultraviolet light (300 to 400 nm) of 0.8 mW/cm² for 350 hours by using an accelerated weather meter is 1.5 or less.

9. A light-modulating liquid-crystal element, comprising two substrates each of which have an electrode layer and at least one of which is transparent and a light-modulating layer supported between these substrates, the light-modulating layer being composed of a nematic liquid-crystal material and a transparent solid substance, the nematic liquid-crystal material containing one or more compounds selected from the compounds represented by the general formula (I) as component (a) and/or one or more compounds selected from the compounds represented by the general formula (II) as component (b), and one or more compounds selected from the compounds represented by the general formula (III) as component (c), the nematic liquid-crystal material being dispersed as independent microdroplets in the transparent solid substance, the microdroplets having an average particle diameter of 0.1 to 50 μm:

[Formula 1]

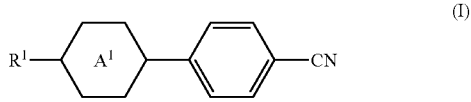
(I)

wherein $R^1$ is an alkyl group having 1 to 10 carbon atoms and optionally an ether bond or an alkoxy group having 1 to 10 carbon atoms,
$A^1$ is trans-1,4-cyclohexylene or 1,4-phenylene;

[Formula 2]

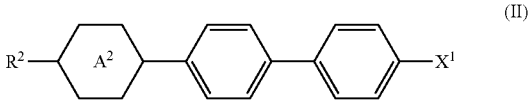
(II)

wherein $R^2$ is an alkyl group having 1 to 10 carbon atoms and optionally an ether bond or an alkoxy group having 1 to 10 carbon atoms,
$A^2$ is trans-1,4-cyclohexylene or 1,4-phenylene,
$X^1$ is a cyano group, an alkyl group having 1 to 10 carbon atoms and optionally an ether bond, or an alkoxy group having 1 to 10 carbon atoms;

[Formula 3]

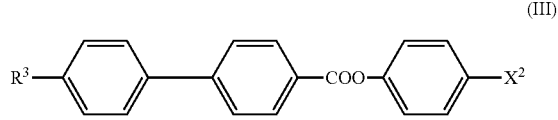
(III)

wherein $R^3$ is an alkyl group having 1 to 10 carbon atoms and optionally an ether bond or an alkoxy group having 1 to 10 carbon atoms, and $X^2$ is a cyano group, an alkyl group having 1 to 10 carbon atoms and an ether bond, wherein the nematic liquid-crystal material contains no compound with a partial structure represented by the following general formula (IV):

[Formula 4]

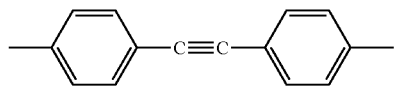

(IV)

wherein the benzene ring optionally has a plurality of substituents.

10. The light-modulating liquid-crystal element according to claim 9, wherein the change in yellowness index ($\Delta b^*$ in the $L^*a^*b^*$ color specification system) before and after irradiation with ultraviolet light (300 to 400 nm) of 0.8 mW/cm$^2$ for 350 hours by using an accelerated weather meter is 1.5 or less.

* * * * *